United States Patent
Pedlow, Jr. et al.

(10) Patent No.: US 7,263,187 B2
(45) Date of Patent: Aug. 28, 2007

(54) BATCH MODE SESSION-BASED ENCRYPTION OF VIDEO ON DEMAND CONTENT

(75) Inventors: Leo M. Pedlow, Jr., Ramona, CA (US); Davender Agnihotri, Murrieta, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 401 days.

(21) Appl. No.: 10/828,737

(22) Filed: Apr. 21, 2004

(65) Prior Publication Data

US 2005/0097598 A1  May 5, 2005

Related U.S. Application Data

(63) Continuation-in-part of application No. 10/823,431, filed on Apr. 13, 2004, and a continuation-in-part of application No. 10/802,008, filed on Mar. 16, 2004, and a continuation-in-part of application No. 10/802,007, filed on Mar. 16, 2004, and a continuation-in-part of application No. 10/802,084, filed on Mar. 16, 2004, and a continuation-in-part of application No. 10/764,011, filed on Jan. 23, 2004, and a continuation-in-part of application No. 10/764,202, filed on Jan. 23, 2004.

(60) Provisional application No. 60/516,131, filed on Oct. 31, 2003.

(51) Int. Cl.
*H04L 9/00* (2006.01)
*H04N 7/167* (2006.01)
*H04K 1/00* (2006.01)
*H04N 7/16* (2006.01)
*H04N 1/44* (2006.01)
*H04N 7/30* (2006.01)
*H04N 5/913* (2006.01)
*H04N 5/91* (2006.01)

(52) U.S. Cl. .................. 380/211; 380/42; 380/200; 380/239; 380/255; 380/277

(58) Field of Classification Search ................ 380/211, 380/239, 200, 42, 255, 277
See application file for complete search history.

(56) References Cited

U.S. PATENT DOCUMENTS 3,852,519 A  12/1974  Court
(Continued)

FOREIGN PATENT DOCUMENTS

EP  0471373  2/1992
(Continued)

OTHER PUBLICATIONS

Jiejun Kong and Xiaoyan Hong, "ANODR: ANonymous On Demand Routing with Untraceable Routes for Mobile Ad-hoc Networks", Proceedings of the 4th ACM International Symposium on Mobile Ad-hoc Networking and Computing MobiHoc '03, Jun. 2003, pp. 291-302.*
(Continued)

*Primary Examiner*—Matthew Smithers
*Assistant Examiner*—Courtney D Fields
(74) *Attorney, Agent, or Firm*—Miller Patent Services; Jerry A. Miller

(57) ABSTRACT

A Video On Demand (VOD) method consistent with certain embodiments involves processing content to be delivered in a VOD method by selecting first portions of the content for encryption under a selective encryption system and selecting second portions of the content to remain unencrypted. The first and second portions are stored until receiving a request for delivery of the content, the request being from a terminal having decryption capabilities associated with a first decryption method. The first portions are then bulk encrypted to produce encrypted first portions. The encrypted first portions are stored in a buffer. The second portions are queued for delivery to the terminal. A stream of selectively encrypted content is assembled from the encrypted first portions and the second portions. This abstract is not to be considered limiting, since other embodiments may deviate from the features described in this abstract.

46 Claims, 13 Drawing Sheets

U.S. PATENT DOCUMENTS

| | | |
|---|---|---|
| 4,381,519 A | 4/1983 | Wilkinson et al. |
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. |
| 4,772,947 A | 9/1988 | Kondo |
| 4,785,361 A | 11/1988 | Brotby |
| 4,788,589 A | 11/1988 | Kondo |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,914,515 A | 4/1990 | Van Luyt |
| 4,924,310 A | 5/1990 | von Brandt |
| 4,944,006 A | 7/1990 | Citta et al. |
| 4,953,023 A | 8/1990 | Kondo |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A | 6/1994 | Finkelstein et al. |
| 5,325,432 A | 6/1994 | Gardeck et al. |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,444,782 A | 8/1995 | Adams, Jr. et al. |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,528,608 A | 6/1996 | Shimizume |
| 5,535,276 A | 7/1996 | Ganesan |
| 5,539,823 A | 7/1996 | Martin |
| 5,539,828 A | 7/1996 | Davis |
| 5,553,141 A | 9/1996 | Lowry et al. |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,598,214 A | 1/1997 | Kondo et al. |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Eillon et al. |
| 5,663,764 A | 9/1997 | Kondo et al. |
| 5,666,293 A | 9/1997 | Metz et al. |
| 5,699,429 A | 12/1997 | Tamer et al. |
| 5,703,889 A | 12/1997 | Shimoda et al. |
| 5,717,814 A | 2/1998 | Abecassis |
| 5,726,711 A | 3/1998 | Boyce |
| 5,732,346 A | 3/1998 | Lazaridis et al. |
| 5,742,680 A | 4/1998 | Wilson |
| 5,742,681 A | 4/1998 | Giachettie et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith |
| 5,757,417 A | 5/1998 | Aras et al. |
| 5,757,909 A | 5/1998 | Park |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasiliewski et al. |
| 5,894,320 A | 4/1999 | Vancelette |
| 5,894,516 A | 4/1999 | Brandenburg |
| 5,915,018 A | 6/1999 | Aucsmith |
| 5,917,830 A | 6/1999 | Chen et al. |
| 5,922,048 A | 7/1999 | Emura |
| 5,923,755 A | 7/1999 | Birch et al. |
| 5,930,361 A | 7/1999 | Hayashi et al. |
| 5,933,500 A | 8/1999 | Blatter et al. |
| 5,940,738 A | 8/1999 | Rao |
| 5,949,877 A | 9/1999 | Traw et al. |
| 5,949,881 A | 9/1999 | Davis |
| 5,963,909 A | 10/1999 | Warren et al. |
| 5,973,679 A | 10/1999 | Abbott et al. |
| 5,973,722 A | 10/1999 | Wakai et al. |
| 5,999,622 A | 12/1999 | Yasukawa et al. |
| 5,999,698 A | 12/1999 | Nakai et al. |
| 6,005,561 A | 12/1999 | Hawkins et al. |
| 6,011,849 A | 1/2000 | Orrin |
| 6,012,144 A | 1/2000 | Pickett |
| 6,016,348 A | 1/2000 | Blatter et al. |
| 6,021,199 A | 2/2000 | Ishibashi |
| 6,021,201 A | 2/2000 | Bakhle et al. |
| 6,026,164 A | 2/2000 | Sakamoto et al. |
| 6,028,932 A | 2/2000 | Park |

| | | | | | | |
|---|---|---|---|---|---|---|
| 6,049,613 | A | 4/2000 | Jakobsson | 6,557,031 B1 | 4/2003 | Mimura et al. |
| 6,055,314 | A | 4/2000 | Spies et al. | 6,587,561 B1 | 7/2003 | Sered et al. |
| 6,055,315 | A | 4/2000 | Doyle et al. | 6,590,979 B1 | 7/2003 | Ryan |
| 6,057,872 | A | 5/2000 | Candelore | 6,640,145 B2 | 10/2003 | Hoffberg et al. |
| 6,058,186 | A | 5/2000 | Enari | 6,650,754 B2 | 11/2003 | Akiyama et al. |
| 6,058,192 | A | 5/2000 | Guralnick et al. | 6,654,389 B1 | 11/2003 | Brunheroto et al. |
| 6,061,451 | A | 5/2000 | Muratani et al. | 6,678,740 B1 | 1/2004 | Rakib et al. |
| 6,064,748 | A | 5/2000 | Hogan | 6,681,326 B2 | 1/2004 | Son et al. |
| 6,065,050 | A | 5/2000 | DeMoney | 6,684,250 B2 | 1/2004 | Anderson et al. |
| 6,069,647 | A | 5/2000 | Sullivan et al. | 6,697,489 B1 | 2/2004 | Candelore |
| 6,070,245 | A | 5/2000 | Murphy, Jr. et al. | 6,697,944 B1 | 2/2004 | Jones et al. |
| 6,072,872 | A | 6/2000 | Chang et al. | 6,714,650 B1 | 3/2004 | Maillard et al. |
| 6,072,873 | A | 6/2000 | Bewick | 6,754,276 B1 | 6/2004 | Harumoto et al. |
| 6,073,122 | A | 6/2000 | Wool | 6,772,340 B1 | 8/2004 | Peinado et al. |
| 6,088,450 | A | 7/2000 | Davis et al. | 6,788,690 B2 | 9/2004 | Harri |
| 6,105,134 | A | 8/2000 | Pinder et al. | 6,826,185 B1 | 11/2004 | Montanaro et al. |
| 6,108,422 | A | 8/2000 | Newby et al. | 6,891,565 B1 | 5/2005 | Dietrich |
| 6,115,821 | A | 9/2000 | Newby et al. | 6,895,128 B2 | 5/2005 | Bohnenkamp |
| 6,118,873 | A | 9/2000 | Lotspiech et al. | 6,917,684 B1 | 7/2005 | Tatebayashi et al. |
| 6,134,551 | A | 10/2000 | Aucsmith | 6,938,162 B1 | 8/2005 | Nagai et al. |
| 6,138,237 | A | 10/2000 | Ruben et al. | 6,976,166 B2 | 12/2005 | Herley et al. |
| 6,148,082 | A | 11/2000 | Slattery et al. | 7,039,938 B2 * | 5/2006 | Candelore ................ 380/211 |
| 6,154,206 | A | 11/2000 | Ludtke | 7,065,213 B2 | 6/2006 | Pinder |
| 6,157,719 | A | 12/2000 | Wasilewski et al. | 7,120,250 B2 | 10/2006 | Candelore |
| 6,181,334 | B1 | 1/2001 | Freeman et al. | 7,124,303 B2 | 10/2006 | Candelore |
| 6,185,369 | B1 | 2/2001 | Ko et al. | 7,127,619 B2 | 10/2006 | Unger et al. |
| 6,185,546 | B1 | 2/2001 | Davis | 7,139,398 B2 | 11/2006 | Candelore et al. |
| 6,189,096 | B1 | 2/2001 | Haverty | 7,141,833 B2 | 12/2006 | Candelore et al. |
| 6,192,131 | B1 | 2/2001 | Geer et al. | 7,151,831 B2 | 12/2006 | Candelore et al. |
| 6,199,053 | B1 | 3/2001 | Herbert et al. | 7,155,012 B2 | 12/2006 | Candelore et al. |
| 6,204,843 | B1 | 3/2001 | Freeman et al. | 2001/0030959 A1 | 10/2001 | Ozawa et al. |
| 6,209,098 | B1 | 3/2001 | Davis | 2001/0036271 A1 | 11/2001 | Javed |
| 6,215,484 | B1 | 4/2001 | Freeman et al. | 2001/0051007 A1 | 12/2001 | Teshima |
| 6,226,618 | B1 | 5/2001 | Downs | 2002/0003881 A1 | 1/2002 | Reitmeier et al. |
| 6,229,895 | B1 | 5/2001 | Son et al. | 2002/0026587 A1 | 2/2002 | Talstra et al. |
| 6,230,194 | B1 | 5/2001 | Frailong et al. | 2002/0046406 A1 | 4/2002 | Chelehmal et al. |
| 6,230,266 | B1 | 5/2001 | Perlman et al. | 2002/0047915 A1 | 4/2002 | Misu |
| 6,236,727 | B1 | 5/2001 | Ciacelli et al. | 2002/0059425 A1 | 5/2002 | Belfiore et al. |
| 6,240,553 | B1 | 5/2001 | Son et al. | 2002/0066101 A1 | 5/2002 | Gordon et al. |
| 6,246,720 | B1 | 6/2001 | Kutner et al. | 2002/0083317 A1 | 6/2002 | Ohta et al. |
| 6,256,747 | B1 | 7/2001 | Inohara et al. | 2002/0083438 A1 | 6/2002 | So et al. |
| 6,263,506 | B1 | 7/2001 | Ezaki et al. | 2002/0097322 A1 | 7/2002 | Monroe et al. |
| 6,266,416 | B1 | 7/2001 | Sigbjornsen et al. | 2002/0108035 A1 | 8/2002 | Herley et al. |
| 6,266,480 | B1 | 7/2001 | Ezaki et al. | 2002/0116705 A1 | 8/2002 | Perlman et al. |
| 6,272,538 | B1 | 8/2001 | Holden et al. | 2002/0126890 A1 | 9/2002 | Katayama et al. |
| 6,278,783 | B1 | 8/2001 | Kocher et al. | 2002/0129243 A1 | 9/2002 | Nanjundiah |
| 6,289,455 | B1 | 9/2001 | Kocher et al. | 2002/0150239 A1 | 10/2002 | Carny et al. |
| 6,292,568 | B1 | 9/2001 | Atkins, III et al. | 2002/0164022 A1 | 11/2002 | Strasser et al. |
| 6,292,892 | B1 | 9/2001 | Davis | 2002/0170053 A1 | 11/2002 | Peterka et al. |
| 6,307,939 | B1 | 10/2001 | Vigarie | 2002/0184506 A1 | 12/2002 | Perlman |
| 6,311,012 | B1 | 10/2001 | Cho et al. | 2002/0194613 A1 | 12/2002 | Unger |
| 6,324,288 | B1 | 11/2001 | Hoffman | 2002/0196939 A1 | 12/2002 | Unger et al. |
| 6,351,538 | B1 | 2/2002 | Uz | 2003/0002854 A1 | 1/2003 | Belknap et al. |
| 6,377,589 | B1 | 4/2002 | Knight et al. | 2003/0009669 A1 | 1/2003 | White et al. |
| 6,378,130 | B1 | 4/2002 | Adams | 2003/0012286 A1 | 1/2003 | Ishtiaq et al. |
| 6,389,537 | B1 | 5/2002 | Davis et al. | 2003/0021412 A1 | 1/2003 | Candelore et al. |
| 6,389,533 | B1 | 6/2002 | Davis et al. | 2003/0026423 A1 | 2/2003 | Unger et al. |
| 6,415,031 | B1 | 7/2002 | Colligan et al. | 2003/0026523 A1 | 2/2003 | Unger et al. |
| 6,415,101 | B1 | 7/2002 | deCarmo et al. | 2003/0046686 A1 | 3/2003 | Candelore et al. |
| 6,430,361 | B2 | 8/2002 | Lee | 2003/0059047 A1 | 3/2003 | Iwamura |
| 6,445,738 | B1 | 9/2002 | Zdepski et al. | 2003/0063615 A1 | 4/2003 | Luoma et al. |
| 6,449,718 | B1 | 9/2002 | Rucklidge et al. | 2003/0072555 A1 | 4/2003 | Yap et al. |
| 6,453,115 | B1 | 9/2002 | Boyle | 2003/0077071 A1 | 4/2003 | Lin et al. |
| 6,456,985 | B1 | 9/2002 | Ohtsuka | 2003/0081630 A1 | 5/2003 | Mowery et al. |
| 6,459,427 | B1 | 10/2002 | Mao et al. | 2003/0081776 A1 | 5/2003 | Candelore |
| 6,463,152 | B1 | 10/2002 | Takahashi | 2003/0084284 A1 | 5/2003 | Ando et al. |
| 6,466,671 | B1 | 10/2002 | Maillard et al. | 2003/0097662 A1 | 5/2003 | Russ et al. |
| 6,505,032 | B1 | 1/2003 | McCorkle et al. | 2003/0112333 A1 | 6/2003 | Chen et al. |
| 6,505,299 | B1 | 1/2003 | Zeng et al. | 2003/0118243 A1 | 6/2003 | Sezer et al. |
| 6,510,554 | B1 | 1/2003 | Gorden et al. | 2003/0123664 A1 | 7/2003 | Pedlow et al. |
| 6,519,693 | B1 | 2/2003 | Debey | 2003/0123849 A1 | 7/2003 | Nallur et al. |
| 6,529,526 | B1 | 3/2003 | Schneidewend | 2003/0126086 A1 | 7/2003 | Safadi |
| 6,543,053 | B1 | 4/2003 | Li et al. | 2003/0133570 A1 | 7/2003 | Candelore et al. |

| | | |
|---|---|---|
| 2003/0140257 A1 | 7/2003 | Peterka et al. |
| 2003/0145329 A1 | 7/2003 | Candelore |
| 2003/0152224 A1 | 8/2003 | Candelore et al. |
| 2003/0152226 A1 | 8/2003 | Candelore et al. |
| 2003/0156718 A1 | 8/2003 | Candelore et al. |
| 2003/0159139 A1 | 8/2003 | Candelore et al. |
| 2003/0159140 A1 | 8/2003 | Candelore |
| 2003/0159152 A1 | 8/2003 | Lin et al. |
| 2003/0174837 A1 | 9/2003 | Candelore et al. |
| 2003/0174844 A1 | 9/2003 | Candelore |
| 2003/0188154 A1 | 10/2003 | Dallard |
| 2003/0190054 A1 | 10/2003 | Troyansky et al. |
| 2003/0193973 A1 | 10/2003 | Takashimizu et al. |
| 2003/0198223 A1 | 10/2003 | Mack et al. |
| 2003/0204717 A1 | 10/2003 | Kuehnel |
| 2003/0222994 A1 | 12/2003 | Dawson |
| 2003/0226149 A1 | 12/2003 | Chun et al. |
| 2003/0228018 A1 | 12/2003 | Vince |
| 2004/0003008 A1 | 1/2004 | Wasilewski et al. |
| 2004/0010717 A1 | 1/2004 | Simec et al. |
| 2004/0021764 A1 | 2/2004 | Driscoll, Jr. et al. |
| 2004/0028227 A1 | 2/2004 | Yu |
| 2004/0047470 A1 | 3/2004 | Candelore |
| 2004/0049688 A1 | 3/2004 | Candelore et al. |
| 2004/0049690 A1 | 3/2004 | Candelore et al. |
| 2004/0049691 A1 | 3/2004 | Candelore et al. |
| 2004/0049694 A1 | 3/2004 | Candelore |
| 2004/0064688 A1 | 4/2004 | Jacobs |
| 2004/0068659 A1 | 4/2004 | Diehl |
| 2004/0073917 A1 | 4/2004 | Pedlow, Jr. et al. |
| 2004/0078575 A1 | 4/2004 | Morten et al. |
| 2004/0081333 A1 | 4/2004 | Grab et al. |
| 2004/0086127 A1 | 5/2004 | Candelore |
| 2004/0088552 A1 | 5/2004 | Candelore |
| 2004/0088558 A1 | 5/2004 | Candelore |
| 2004/0091109 A1 | 5/2004 | Son et al. |
| 2004/0100510 A1 | 5/2004 | Milic-Frayling et al. |
| 2004/0123094 A1 | 6/2004 | Sprunk |
| 2004/0136532 A1 | 7/2004 | Pinder et al. |
| 2004/0139337 A1 | 7/2004 | Pinder et al. |
| 2004/0151314 A1 | 8/2004 | Candelore |
| 2004/0158721 A1 | 8/2004 | Candelore |
| 2004/0165586 A1 | 8/2004 | Read et al. |
| 2004/0181666 A1 | 9/2004 | Candelore |
| 2004/0187161 A1 | 9/2004 | Cao |
| 2004/0193550 A1 | 9/2004 | Siegal |
| 2004/0240668 A1 | 12/2004 | Bonan et al. |
| 2004/0267602 A1* | 12/2004 | Gaydos et al. ........... 705/10 |
| 2005/0004875 A1 | 1/2005 | Kontio et al. |
| 2005/0028193 A1 | 2/2005 | Candelore et al. |
| 2005/0036067 A1 | 2/2005 | Ryal et al. |
| 2005/0063541 A1 | 3/2005 | Candelore |
| 2005/0066357 A1 | 3/2005 | Ryal |
| 2005/0071669 A1 | 3/2005 | Medvinsky et al. |
| 2005/0094808 A1 | 5/2005 | Pedlow, Jr. et al. |
| 2005/0094809 A1 | 5/2005 | Pedlow, Jr. et al. |
| 2005/0097596 A1 | 5/2005 | Pedlow, Jr. |
| 2005/0097597 A1 | 5/2005 | Pedlow, Jr. et al. |
| 2005/0097598 A1 | 5/2005 | Pedlow, Jr. et al. |
| 2005/0097614 A1 | 5/2005 | Pedlow, Jr. et al. |
| 2005/0102702 A1 | 5/2005 | Candelore et al. |
| 2005/0129233 A1 | 6/2005 | Pedlow, Jr. |
| 2005/0141713 A1 | 6/2005 | Genevois |
| 2005/0169473 A1 | 8/2005 | Candelore |
| 2005/0192904 A1 | 9/2005 | Candelore |
| 2005/0259813 A1 | 11/2005 | Wasilewski et al. |
| 2005/0265547 A1 | 12/2005 | Strasser et al. |
| 2006/0115083 A1 | 6/2006 | Candelore et al. |
| 2006/0130119 A1 | 6/2006 | Candelore et al. |
| 2006/0130121 A1 | 6/2006 | Candelore et al. |
| 2006/0136976 A1 | 6/2006 | Coupe et al. |
| 2006/0153379 A1 | 7/2006 | Candelore et al. |
| 2006/0168616 A1 | 7/2006 | Candelore |
| 2006/0174264 A1 | 8/2006 | Candelore |
| 2006/0262926 A1 | 11/2006 | Candelore et al. |
| 2006/0269060 A1 | 11/2006 | Candelore et al. |

FOREIGN PATENT DOCUMENTS

| | | |
|---|---|---|
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0674440 | 9/1995 |
| EP | 0674441 | 9/1995 |
| EP | 0833517 | 4/1998 |
| EP | 0866615 | 9/1998 |
| EP | 1187483 | 3/2002 |
| JP | 7067028 | 3/1995 |
| JP | 11243534 | 10/2002 |
| WO | WO86/07224 | 12/1986 |
| WO | WO94/10775 | 5/1994 |
| WO | WO97/38530 | 10/1997 |
| WO | WO 00/31964 | 6/2000 |
| WO | WO 01/65762 | 9/2001 |
| WO | WO 01/78386 | 10/2001 |
| WO | WO 2004105307 A1 * | 12/2004 |

OTHER PUBLICATIONS

"A Report on Security Issues in Multimedia" by Gulwani, pp. 10-14, Apr. 30, 2000, Course Notes, Department of Computer Science and Engineering, Indian Institute of Technology Kanpur.

"Ad Agencies and Advertisers To Be Empowered with Targeted Ads Delivered by Television's Prevailing Video Servers" Article Business Section of The New York Times, Updated Thursday, Dec. 20, 2001.

"An Efficient MPEG Video Encryption Algorithm" by Shi and Bhargava, pp. 381-386, 1998 IEEE.

"An Empirical Study of Secure MPEG Video Transmissions" by Agi and Gong, pp. 137-144, 1996, IEEE, Proceedings of SNDSS '96.

"Applying Encryption to Video Communication" by Kunkelmann, pp. 41-47, Sep. 1998, Multimedia and Security Workshop at ACM Multimedia '98. Bristol, U.K.

"Comparison of MPEG Encryption Algorithms" by Qiao and Nahrstedt, Jan. 17, 1998, Preprint submitted to Elsevier Science.

"Coral Consortium Aims to Make DRM Interoperable", by Bill Rosenblatt, Oct. 7, 2004, online at http://www.drmwatch.com/standards/article.php/3418741.

"DVD Demystified—The Guidebook for DVD-Video and DVD-ROM" by Jim Taylor, Pub. McGraw-Hill, 1998, ISBN:.0-07-064841-7, pp. 134-147.

"Dynamic-Customized TV Advertising Creation and Production Tools" by SeaChange International, Web Site Literature.

"Efficient Frequency Domain Video Scrambling for Content Access Control" by Zeng and Lei, Nov. 1999, in Proc. ACM Multimedia.

"Evaluation of Selective Encryption Techniques for Secure Transmission of MPEG-Compressed Bit-Streams" by Alattar and Al-Regib, pp. IV-340 to IV-343, 1999, IEEE.

"Fast Encryption Methods for Audiovisual Data Confidentiality" by Wu and Kuo, Nov. 2000, SPIE International Symposia on Information Technologies 2000, (Boston, Ma., USA).

"Improved Selective Encryption Techniques for Secure Transmission of MPEG Video Bit-Streams" by Alattar, Al-Regib and Al-Semari, pp. 256-260, 1999, IEEE.

Metro Media™ PVR-DVD-MP3-Web—Internet publication from www.metrolink.com, undated.

"Multimedia and Security Workshop at ACM Multimedia" '98. Bristol, U.K., Sep. 1998.

"Passage™, Freedom to Choose", 2003, Sony Electronics Inc.

"Performance Study of a Selective Encryption Scheme for the Security of Networked, Real-Time Video" by Spanos and Maples, pp. 2-10, 1995, IEEE.

"Pre-Encryption Profiles—Concept Overview and Proposal", Rev. 1.2 as submitted to the Open CAS consortium on Dec. 28, 2000.

"Run-Time Performance Evaluation for a Secure MPEG System Supporting Both Selective Watermarking and Encryption" by Wu and Wu, Mar. 1, 1997, submitted to JSAC special issue on Copyright and Privacy Protection.

"Selective Encryption and Watermarking of MPEG Video (Extended Abstract)" by Wu and Wu, Feb. 17, 1997, submitted to International Conference on Image Science, Systems, and Technology, CISST'97.

"The Long March to Interoperable Digital Rights Management" by Koenen et al., pp. 1-17, 2004, IEEE.

"Transport Streams Insertion of Video in the Compressed Digital Domain" by SeaChange International, Web Site Literature, 2000.

"Visible World—A High Impact Approach to Customized Television Advertising" by Haberman, Dec. 2001.

ANONYMOUS, Message Authentication with Partial Encryption, Research discosure RD 296086, Dec. 10, 1998.

McCormac Hack Over Cablemodem, HackWatch Aug. 10, 1998.

ANONYMOUS, New Digital Copy Protection Proposal Would Secure Authorized Copies, PR Newswire, Nov. 1998, pp. 1-3.

Aravind, H., et al., "Image and Video Coding Standards", AT&T Technical Journal, (Jan./Feb. 1993), 67-68.

Gonzalez, R. C., et al., "Digital Image Processing", Addison Wesley Publishing Company, Inc., (1992),346-348.

Kim, et al., "Bit Rate Reduction Algorithm for a Digital VCR", IEEE Transactions on Consumer Electronics, vol. 37, No. 3, (Aug. 1, 1992),267-274.

Kondo, et al., "A New Concealment Method for Digital VCRs", IEEE Visual Signal Processing and Communication, Melbourne, Australia, (Sep. 1993),20-22.

Kondo, et al., "Adaptive Dynamic Range Coding Scheme for Future Consumer Digital VTR", 219-226.

Kondo, et al., "Adaptive Dynamic Range Coding Scheme for Future HDTV Digital VTR", Sony Corporation, (1991).

Lakshiminath, et al., "A Dual Protocol for Scalable Secure Multicasting", 1999 International Symposium on Computers and Communication, Jul. 6-8, 1999.

Lookabaugh et al., "Selective Encryption and MPEG-2", ACM Multimedia '03, Nov. 2003.

Menezes, Alfred J., et al., "Handbook of Applied Cryptography", CRC Press, 551-553.

NHK Laboratories Note, "Error Correction, Concealment and Shuffling", No. 424, (Mar. 1994),29-44.

Park, et al., "A Simple Concealment for ATM Bursty Cell Loss", IEEE Transactions on Consumer Electronics, No. 3, (Aug. 1993), 704-709.

Robert et al., "Digital Cable: The Key to Your Content", Access Intelligence's Cable Group, Feb. 2002, online at http:www.cableworld.com/ct/archives/0202/0202digitalrights.htm.

Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.

Zhu, et al., "Coding and Cell-Loss Recovery in DCT-Based Packet Video", IEEE Transactions on Circuits and Systems for Video Technology, No. 3, NY,(Jun. 6, 1993).

"ClearPlay: The Technology of Choice", from web site, ClearPlay 2001-2003.

Alattar, A.M. et al., Improved selective encryption techniques for secure transmission of MPEG video bitstreams, Oct. 24, 1999, Digimarc Corp., Lake Oswego, OR, USA, IEEE, pp. 256-260.

Kunkelmann T. et al., A scalable security architecture for multimedia communication standards, Darmstard Univ. of Technology, ITO, Germany, 1997, pp. 660-661.

Yip, Kun-Wah, Partial-encryption technique for intellectual property protection of FPGA-Based products, Dec. 15, 1999, IEEE, pp. 183-190.

International Search Report for application No. PCT/US2004/032228.

"How Networks Work—Milennium Edition"—pp. 88-89, Que Corporation, 2000.

* cited by examiner

BATCH MODE SESSION-BASED ENCRYPTION OF VIDEO ON DEMAND CONTENT

CROSS REFERENCE TO RELATED DOCUMENTS

This application is related to and claims priority benefit of U.S. Provisional Patent Application Ser. No. 60/516,131 filed Oct. 31, 2003 to Pedlow et al. for "Batch Mode Session Based Encryption of Video On Demand Content" which is hereby incorporated by reference; this application also claims priority benefit of the following pending U.S. Patent Applications:

Ser. No. 10/764,202, filed Jan. 23, 2004,
Ser. No. 10/764,011, filed Jan. 23, 2004,
Ser. No. 10/802,084, filed Mar. 16, 2004,
Ser. No. 10/802,007, filed Mar. 16, 2004,
Ser. No. 10/802,008, filed Mar. 16, 2004, and
Ser. No. 10/823,431, filed Apr. 13, 2004, each of which names Leo Mark Pedlow, Jr. as an inventor and which are hereby incorporated by reference herein.

This application is also related to U.S. Patent Applications entitled "Critical Packet Partial Encryption" to Unger et al., Ser. No. 10/038,217; patent applications entitled "Time Division Partial Encryption" to Candelore et al., Ser. No. 10/038,032; entitled "Elementary Stream Partial Encryption" to Candelore, Ser. No. 10/037,914; entitled "Partial Encryption and PID Mapping" to Unger et al., Ser. No. 10/037,499; and entitled "Decoding and Decrypting of Partially Encrypted Information" to Unger et al., Ser. No. 10/037,498 all of which were filed on Jan. 2, 2002 and are hereby incorporated by reference herein.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

The Passage™ initiative (Passage is a trademark of Sony Electronics Inc.), promoted by Sony, provides a mechanism for MSOs (Multiple Service Operators) to deploy non-legacy headend equipment, subscriber devices and services on their existing legacy networks. In the USA, these networks are most commonly supplied by either Motorola (formerly General Instrument) or Scientific Atlanta. These two companies at present constitute better than a 99% share of the US cable system market as turnkey system providers. The systems, by design, employ proprietary technology and interfaces precluding the introduction of non-incumbent equipment into the network. An MSO, once choosing one of these suppliers during conversion from an analog cable system to a digital cable system, faces a virtual monopoly when seeking suppliers for additional equipment as their subscriber base or service offering grows.

Before the Passage™ initiative, the only exit from this situation was to forfeit the considerable capital investment already made with the incumbent provider, due to the intentional incompatibility of equipment between the incumbent and other sources. One primary barrier to interoperability is in the area of conditional access systems, the heart of addressable subscriber management and revenue collection resources in a modern digital cable network.

The Passage™ technologies were developed to allow the independent coexistence of two or more conditional access systems on a single, common plant. Unlike other attempts to address the issue, the two systems operate with a common transport stream without any direct or indirect interaction between the conditional access systems. The basic processes used in these technologies are discussed in detail in the above-referenced pending patent applications.

The above-referenced commonly owned patent applications, and others, describe inventions relating to various aspects of methods generally referred to herein as partial encryption or selective encryption, consistent with certain aspects of Passage™. More particularly, systems are described therein wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is consumed to effectively encrypt the content using multiple encryption systems. This results in a cable or satellite system being able to utilize Set-top boxes (STB) or other implementations of conditional access (CA) receivers from multiple manufacturers in a single system—thus freeing the cable or satellite company to competitively shop for providers of Set-top boxes.

In each of these disclosures, the clear content is identified using a primary Packet Identifier (PID). A secondary PID (or shadow PID) is also assigned to the program content. Selected portions of the content are encrypted under two (or more) encryption systems and the encrypted content transmitted using both the primary and secondary PIDs (one PID or set of PIDs for each encryption system). The so-called legacy STBs operate in a normal manner decrypting encrypted packets arriving under the primary PID and ignoring secondary PIDs. The newer (non-legacy) STBs operate by associating both the primary and secondary PIDs with a single program. Packets with a primary PID are decoded normally and packets with a secondary PID are first decrypted then decoded. The packets associated with both PIDs are then assembled together to make up a single program stream. The PID values associated with the packets are generally remapped to a single PID value for decoding (shadow PIDs remapped to the primary PID value or vice versa.)

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

ACRONYMS, ABBREVIATIONS AND DEFINITIONS

Figure 1:
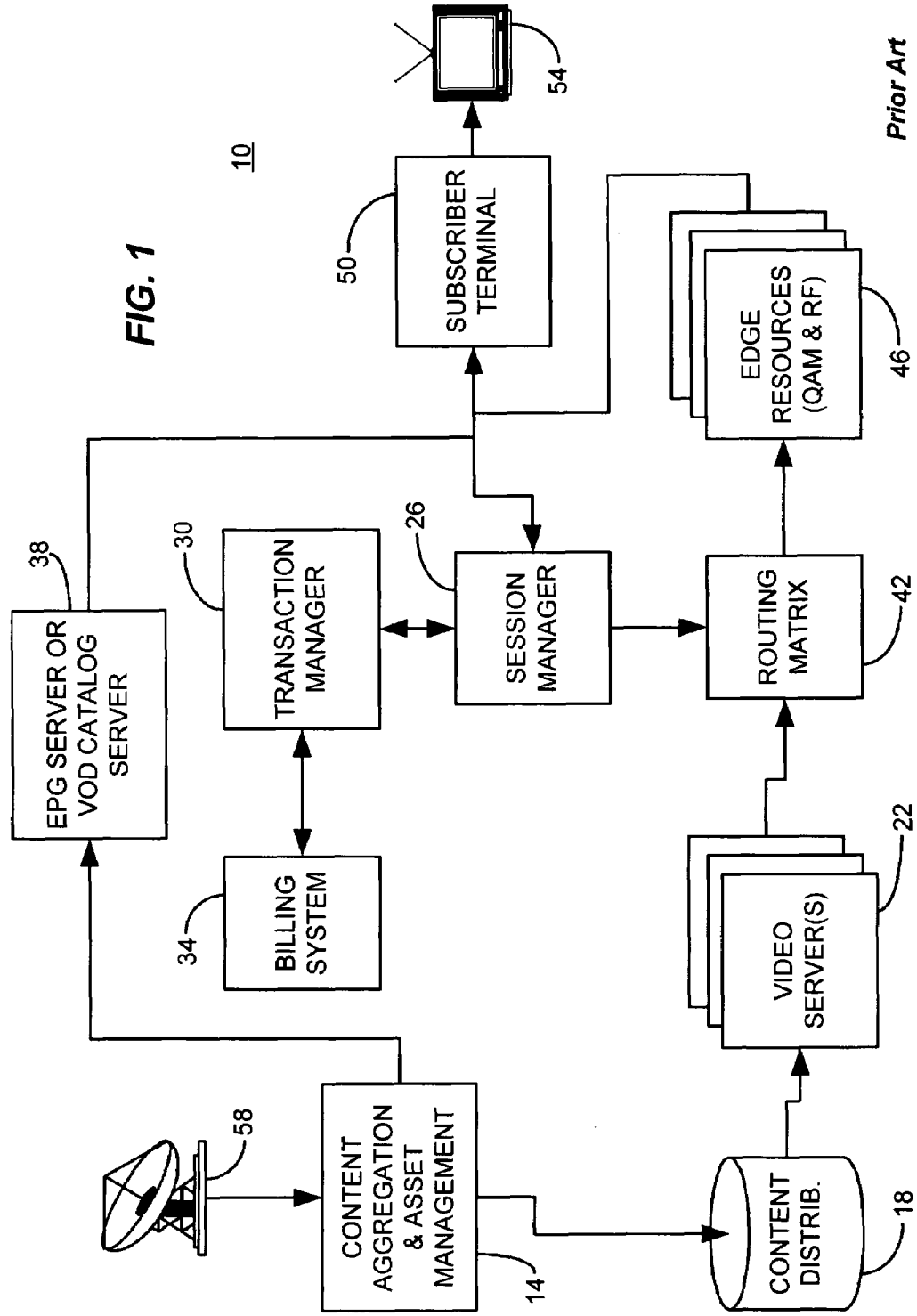
FIG. 1 is a block diagram of a clear video VOD system.

ASI—Asynchronous Serial Interface
CA—Conditional Access
CASID—Conditional Access System Identifier
CPE—Customer Premises Equipment
DHEI—Digital Headend Extended Interface
ECM—Entitlement Control Message
EPG—Electronic Program Guide
GOP—Group of Pictures (MPEG)
MPEG—Moving Pictures Experts Group
MSO—Multiple System Operator
OLES—Off Line Encryption System
PAT—Program Allocation Table
PID—Packet Identifier
PMT—Program Map Table
PSI—Program Specific Information
QAM—Quadrature Amplitude Modulation
RAID—Redundant Array of Independent Disks
RAM—Random Access Memory
SAN—Storage Area Network
VOD—Video on Demand
Critical Packet—A packet or group of packets that, when encrypted, renders a portion of a video image difficult or impossible to view if not properly decrypted, or which renders a portion of audio difficult or impossible to hear if not properly decrypted. The term "critical" should not be interpreted as an absolute term, in that it may be possible to hack an elementary stream to overcome encryption of a "critical packet", but when subjected to normal decoding, the inability to fully or properly decode such a "critical packet" would inhibit normal viewing or listening of the program content.
Selective Encryption (or Partial Encryption)—encryption of only a portion of an elementary stream in order to render the stream difficult or impossible to use (i.e., view or hear).
Dual Selective Encryption—encryption of portions of a single selection of content under two separate encryption systems.
Passage™—Trademark of Sony Electronics Inc. for various single and multiple selective encryption systems, devices and processes.
Trick mode—an operational mode of playback of digital content to simulate fast forward, rewind, pause, suspend (stop), slow motion, etc. operations as in a video tape system.

The terms "a" or "an", as used herein, are defined as one, or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The terms "scramble" and "encrypt" and variations thereof may be used synonymously herein. Also, the term "television program" and similar terms can be interpreted in the normal conversational sense, as well as a meaning wherein the term means any segment of A/V content that can be displayed on a television set or similar monitor device. The term "video" is often used herein to embrace not only true visual information, but also in the conversational sense (e.g., "video tape recorder") to embrace not only video signals but associated audio and data. The term "legacy" as used herein refers to existing technology used for existing cable and satellite systems. The exemplary embodiments of VOD disclosed herein can be decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

Clear VOD Architectures

The decision on a particular VOD architecture is the result of the interaction between a complex set of both independent and dependent variables, providing a solution to an equation of state. Some of the variables are fixed directly as a result of choices by the MSO. Others are constrained by factors such as the existing incumbent system, location, size, available capital and return on investment requirements.

A generalized VOD system 10, as shown in FIG. 1, contains some or all of the following elements/resources: Content Aggregation and Asset management 14, Content distribution (SAN) 18, Video server module(s) 22, Session Management 26, Transaction management 30, Billing system 34, EPG server or VOD catalog server 38, Transport router/switch fabric (routing matrix) 42, Stream encryption device(s) (not shown in this Figure), and QAM modulators/upconverters and other edge resources 46. This VOD system 10 provides programming to the subscriber terminals such as 50 for ultimate viewing and listening on a TV set or other monitor device 54.

In operation, content is received from various sources including, but not limited to, satellite broadcasts received via one or more satellite dishes 58. Content is aggregated at 14 and cataloged at EPG server or VOD catalog server 38. Content is then distributed at 18 to one or more video servers 22. When a subscriber orders a VOD selection, a message is sent from the subscriber terminal (e.g., STB) 50 to the session manager 26. The session manager 26 notifies the transaction manager 30 to assure that the billing system 34 is properly brought into play. The session manager 26 selects a VOD server from a cluster of VOD servers having the requested content on it and having a signal path that reaches the node serving the subscriber. The session manager also enables the routing matrix 42 to properly route the selected video content through the correct edge resources 46 for delivery to the subscriber terminal 50.

Trick Modes

Figure 2:
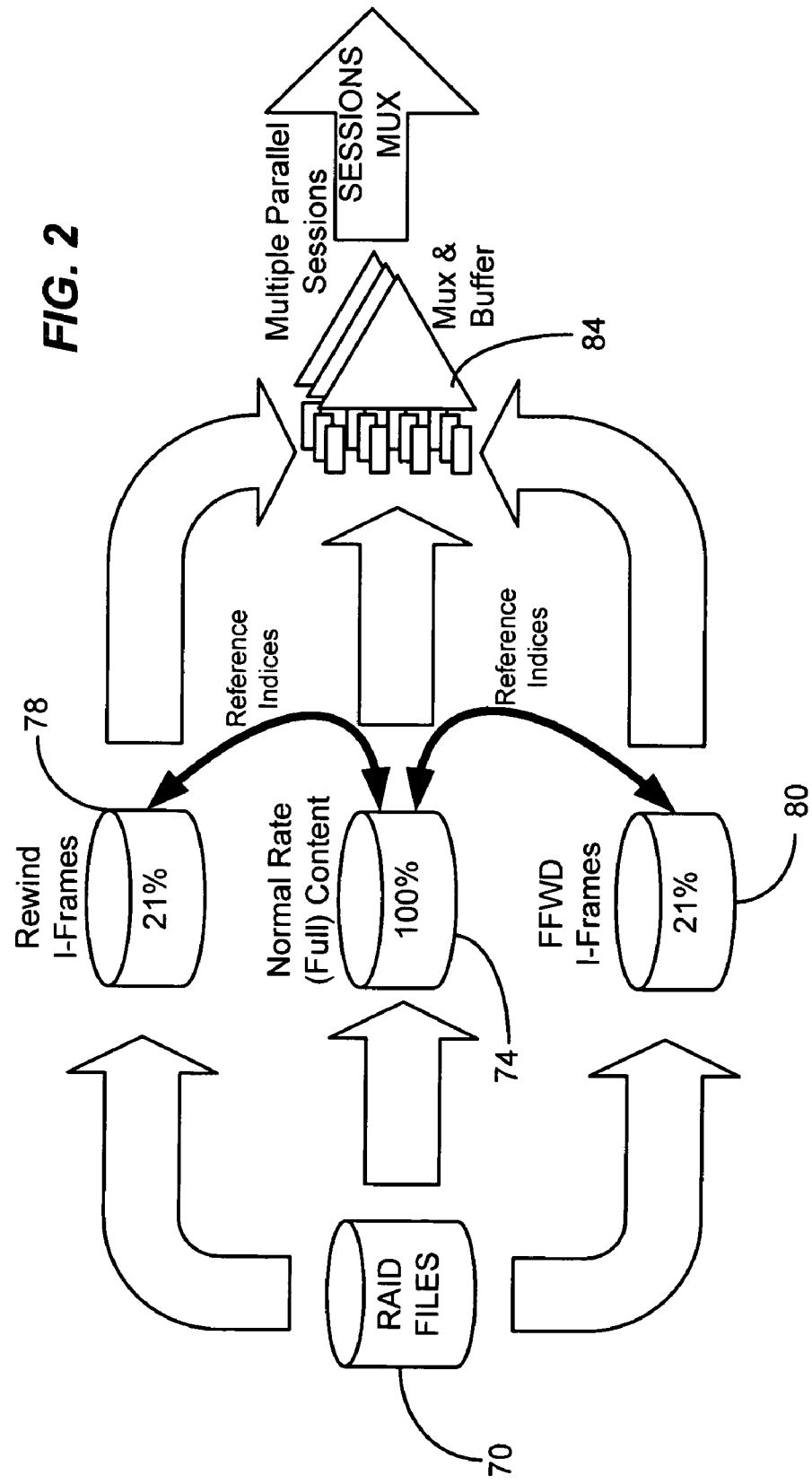
FIG. 2 is a diagram illustrating storage of I-frame data to support trick mode operation in a VOD system.

One aspect of VOD that has become a "signature" feature is the support of "trick modes". These are operational modes invoked by the session client that mimic a traditional VCR or DVD player and includes fast forward, rewind, pause, suspend (stop), slow motion, etc. Trick modes have been heretofore implemented through the creation of multiple files containing a subset of the original content (subfiles) as illustrated in FIG. 2. The content is generally stored in a set of RAID drives 70. A particular selection of content is stored in its entirety in a file 74 within the RAID drives 70. A set of subfiles for rewind and fast forward trick modes (files 78 and 80 respectively) contain I-frames ordered in a manner that will permit playback sequentially to achieve the rewind and fast forward effect. Generally, these subfiles contain only I-frames, since I-frames contain stand-alone whole pictures (see ISO/IEC 13818-2, section 6.1.1.7). I-frames are somewhat larger than B or P frames, and they generally represent approximately 21% of the data in a given video selection.

A file containing only I-frames extracted from the original content affords the ability to have accelerated playback, since typical GOP (group of pictures) structures have only one frame in about 10 to 20 as an I-frame. If the I-frame files are played at normal rates (1 frame per 33 mS) the pictures will appear to the viewer to sequence at about a 10× to 20× rate, though the actual data rate is the same as the original content. If the I-frame sequence is reversed in the file, the motion will appear to run backwards. This is the method used to implement fast forward and rewind.

By attaching an index count to match the I-frames in the original content file to the duplicated I-frames stored in the associated subfiles 78 and 80, a method is provided to allow immediate transition from normal speed forward play to fast forward or rewind. In operation the video server plays the selected content file and upon subscriber selection of a trick mode (or vice versa) the server notes the index value of the closest I-frame and then opens the appropriate associated subfile 78 or 80 and moves to the I-frame in the subfile with the same corresponding index. The video server treats all stream content (main file or subfiles) the same and always spools the MPEG packets to the outgoing transport stream at the same constant bit rate through multiplexers and buffers 84 as shown. It is through this method that trick modes are typically implemented on a slotted, session based system without the encumbrance of additional, dynamic bit rate issues.

Unfortunately, the use of such multiple subfiles results in storage space inefficiencies. As will be seen, these inefficiencies can become compounded in systems utilizing multiple encryption.

VOD Program Specific Information

A function of the VOD video server(s) 22, in addition to origination of session A/V content, is the creation of the associated, session specific PSI (program specific information). This information is a departure from the broadcast model in that the PSI is extremely dynamic. The content of the PAT and subordinate PMTs change whenever a new session is started or ended. In the broadcast world, the PSI changes very seldom because the PSI tables reflect only the structure of the transport multiplex, not the actual A/V content carried within.

The VOD video server 22 dynamically assigns a new session to an existing, available "slot" in an outgoing transport multiplexed stream. The slot is denoted by the MPEG program number and in many cases, the combination of which transport stream (TSID) and program number determine at the service level a unique session and the routing that occurs as a result. Edge resources 46 generally are not configured dynamically. The routing of content appearing on a particular input port to a specific QAM carrier at the output is determined through a preconfigured, static assignment of TSID/input port and program number mapping to specific QAM resources in the device. This same mapping information is also loaded in the VOD system so that once a session is requested by and authorized for a specific subscriber terminal 50, a solution to a routing matrix 42 can be determined to find the appropriate VOD server 22 and QAM transport 46 serving the requestor. This solution also considers dynamic issues such as which servers 22 the requested asset is loaded upon, and server loading/available slots in addition to the simpler, static solution to finding the first possible path to the requesting subscriber terminal 50.

In addition to solving the routing matrix 42 and provisioning the session with PIDs and PSI appropriate to follow the intended route, elements of the same information (program ID and QAM frequency) are also communicated to the session client at subscriber terminal 50 at the subscriber's premises so that the requested stream can be properly received and presented to the subscriber.

Clear VOD Distribution

Perhaps the simplest VOD implementation is a clear VOD distribution system, i.e. one that contains no encryption as depicted in FIG. 1. While not providing any safekeeping of what might be considered the entertainment medium's most valuable properties, namely current feature films, etc., clear VOD avoids many of the issues that the incumbent cable system providers to date have not adequately addressed and that introduction of a second, alternative CA system complicates even further still. Various arrangements for providing selective or full encryption in a VOD environment are discussed below. Throughout this discussion, it is instructive to carry an example VOD movie through the various embodiments to illustrate the relative storage efficiencies obtained with the various systems disclosed. A real world example of a VOD movie which will be used throughout this document has the following attributes:

| | |
|---|---|
| Compressed video data rate: | 3 Mbit/S |
| Movie length: | 120 minutes (2 Hrs) |
| I-frame overhead: | 17% |
| Total storage used for the video portion of a single, clear (unencrypted) copy of a film: | 3.618 GBytes. |

Pre-Encrypted VOD Distribution

Figure 3:
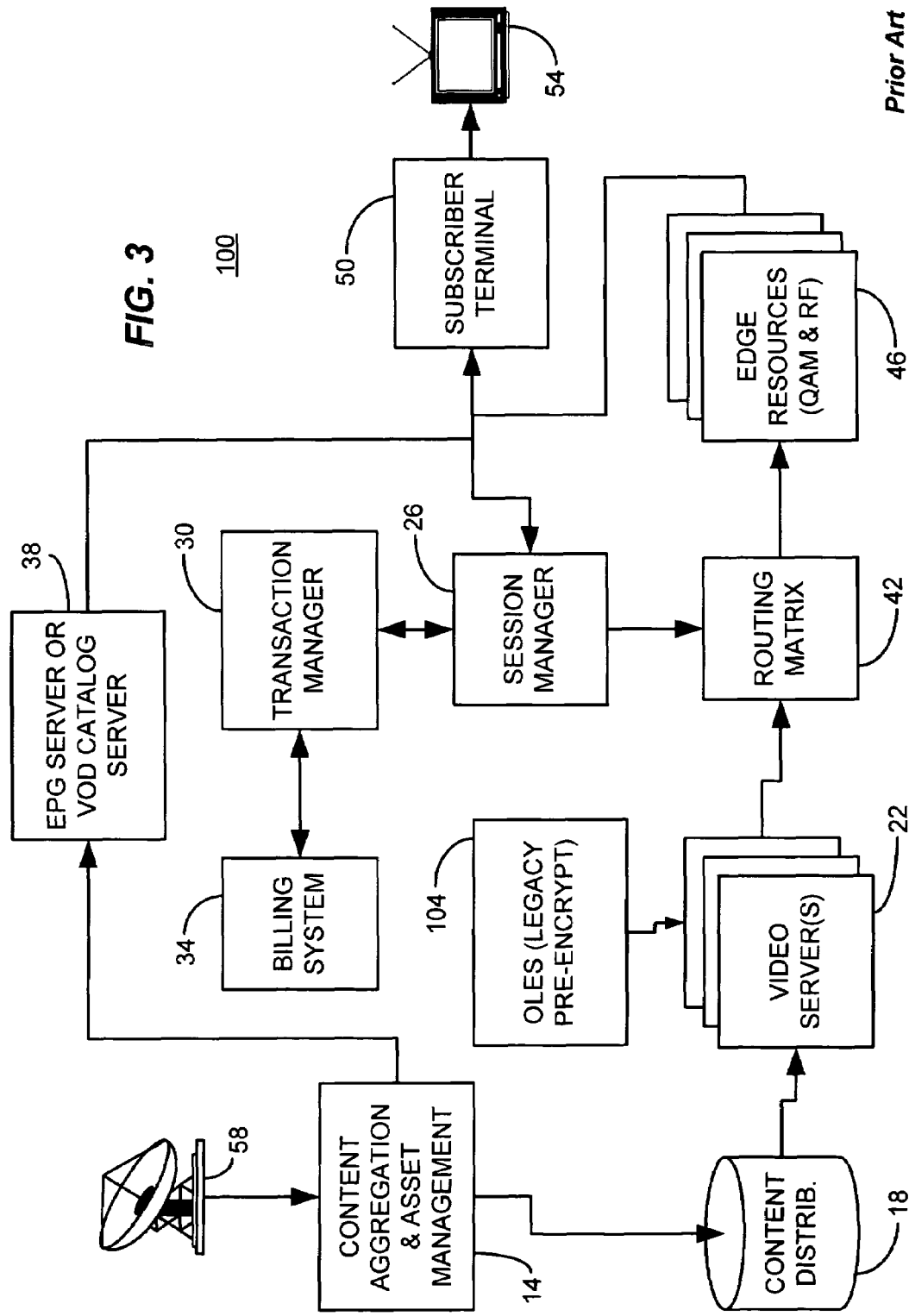
FIG. 3 is a block diagram of a pre-encrypted VOD system using a single (legacy) encryption system.

Pre-encrypted VOD systems such as system 100 shown in FIG. 3 can be architecturally similar to clear VOD distribution systems. One difference between the two is that on pre-encrypted systems there is pre-processing of the content prior to storage in the VOD system to provide safekeeping of content during the storage and distribution phases. This pre-processing is carried out in pre-encryptor 104. Data security is implemented through storage of previously encrypted content within the video server(s) 22. While the clear VOD system contains directly viewable MPEG or other compressed A/V content on the server(s) 22, the pre-encrypted model stores this same content in a form that is only decipherable using a properly entitled subscriber terminal 50.

The pre-encryption process can be performed by the MSO at the time of deployment on the VOD system 100, prior to loading into the storage area network (SAN) used to propagate content to all of the video servers in the MSO's system. Alternatively, the encryption may be performed prior to receipt of the content by the MSO at an external service bureau, content aggregator or by the distributor or studio. In this case, the content is theoretically secured throughout the distribution phase, storage phase and transmission to subscriber for display on an authorized device. The use of pre-encryption prior to distribution of content to the MSO potentially adds to the complexity of entitlement distribution, separate from the content distribution, for installation on the VOD transaction manager 30 to allow bone fide subscribers to decrypt the purchased content.

Many pre-encrypted VOD architectures share one or more of the following common drawbacks:
  Additional handling of new content may be needed to perform the pre-encryption prior to loading into the server, either by the MSO or service bureau.
  Coordination and/or distribution is required for entitlements matching the access criteria used to encrypt the content stored in the server.
  Limited "shelf life" of the encryption keys used to secure the stored content, rendering decryption impossible at a later date.
  Incapability of present VOD video servers to load pre-encrypted streams.
  Incompatibility of pre-encrypted streams with present methods supporting trick mode play (fast-forward & rewind) on screen.
  One common key is used for all sessions accessing a particular program and it remains the same for the duration of time the content is in inventory on the server.
  According to MSOs familiar with the subject, pre-encrypted VOD streams are unsupported by conditional access technologies from certain manufacturer(s).

The issue regarding trick play and pre-encryption is based upon the concept that VOD servers 22 currently expect clear content and then subsequently identify the I-frames and store or otherwise segregate them for access in fast-forward or fast rewind playback modes, as described in conjunction with FIG. 2. If the stream is pre-encrypted prior to storage upon the server, it may be difficult or impossible for the server 22 to examine packet payloads to identify I-frames during the process of importation into the server 22 to create trick mode files 78 and 80 or associated indices. Many current systems will not accept streams for importation that are pre-encrypted.

Segregated Storage Pre-Encryption

A segregated storage mechanism can be physically similar to the architecture of the clear VOD distribution system. The content is encrypted in its entirety (100%) and a separate copy of the complete feature is stored for each different conditional access format supported by the MSO. The organization and configuration of the system is such that when a subscriber initiates a session on the server, the stream files for the selected content containing the CA format appropriate to the specific equipment deployed at the subscriber's premises requesting the session are spooled and delivered. This method offers a low system complexity encrypted VOD system but may suffer from the same issues common to other pre-encryption topologies, mentioned previously. In addition, a very significant storage penalty (one or more encrypted duplicate copies of the same movie) is incurred.

If one refers to the example movie scenario described above, the same movie using 3.618 GB of storage in the clear VOD state would require an additional 7.236 GBytes to store using segregated pre-encryption supporting two different CA systems.

Changes to the method employed by the VOD system are used for creating dynamic PSI data to implement this architecture supporting multiple CA systems. The VOD system session manager is made aware of which conditional access method is appropriate for a session requested by a specific subscriber. This information is in turn transferred to the video server that has been selected as the source for the session so that the appropriate PSI can be created for the session, including conditional access specific data. The video server is cognizant of the conditional access resources (ECMs) for each program stored on the server and these resources can be dynamically allocated on unique PIDs along with PIDs for the corresponding audio and video data. The PSI generated for each specific session, in addition to indicating the assigned PIDs for A/V, indicate the appropriate CASID, which is unique to each conditional access system provider and the PID assigned for the ECMs associated with the session.

Composite Storage Pre-Encryption

Composite storage is essentially the storage on the video server of a selectively encrypted stream such as a Passage™ processed stream that contains previously encrypted "critical packets" for a plurality (two or more) of independent conditional access systems (i.e., dual selective encrypted). The stream may be prepared identically to the processing of a selectively encrypted broadcast stream as described in the above-referenced pending patent applications, except that the resultant transport stream is recorded to a hard disk or other suitable computer readable storage medium, instead of being sent directly to a QAM modulator for HFC distribution to the requesting subscriber. As with other pre-encryption models, the content can be encrypted by either the MSO at time of deployment on the VOD system, a third party service bureau, by the studios themselves (the latter two cases being prior to receipt of the content by the MSO), or by or under control of other entities.

In this embodiment the small additional overhead in content storage (usually about 2%-10% representing "critical packets" that are multiple encrypted) is traded for the support of multiple independent CA formats without replication of entire streams. A negative aspect, in addition to those mentioned previously and common to other pre-encryption topologies, is the vulnerability of the prepared selectively encrypted stream to corruption by downstream equipment containing transport re-multiplexing functionality that is not specifically designed to maintain the integrity of the selective encryption process applied to the stream.

If one refers to the example movie scenario described above, the same movie using 3.618 GB of storage in the clear VOD state would require approximately 3.690 GBytes to store using composite storage pre-encryption supporting two different CA systems with a critical packet "density" of 2%.

Certain changes to the method employed by the VOD system for creating dynamic PSI data can be used to implement this architecture. The VOD system session manager can be made to be aware of which conditional access method is appropriate for a session requested by a specific subscriber. This information is in turn transferred to the video server that has been selected as the source for the session so that the appropriate PSI can be created for the session, including conditional access specific data. The video server is cognizant of the conditional access resources (ECMs) for each program stored on the server and these can be dynamically allocated on unique PIDs along with PIDs for the corresponding audio and video data. The PSI generated for each specific session, in addition to indicating the assigned PIDs for ANV, can indicate the appropriate CASID, which is unique to each conditional access system provider and the PID assigned for the ECMs associated with the session.

Likewise, the video server dynamically allocates another set of PIDs for the shadow packets associated with the respective audio and video component streams for each session in the manner described in the above-referenced patent applications. This information can be included in the PSI sent in sessions requested by non-legacy clients. In total, eight different PIDs and corresponding data resources are dynamically allocated and managed by the server for each session: PAT (one table common to all sessions, but modified for each), PMT, Primary Video, Primary Audio, Shadow Video, Shadow Audio, Legacy ECM and Alternative ECM. Six of these entities can be stored in the embedded stream and use dynamic PID remapping for each session.

Consider the issue of which device to use in conjunction with performing the legacy encryption of the "critical" packets prior to storage on the VOD video server. If the legacy device is specially designed to process content destined for loading into a VOD video server, it may not accept a selectively encrypted stream at its input. The content format specified for VOD servers often uses a single program transport multiplex containing a single PAT entry, single PMT entry and service components, for one audio and one video stream. The shadow packets added in a composite selectively encrypted transport stream may prove problematic for a legacy VOD pre-encryption device, in certain instances. It is more probable that a device or process (since there are no real time requirements, an off-line process running on a PC or UNIX server may suffice) to process a candidate stream before passing through the legacy pre-encryptor and then post-encryption reconcile to extract only the encrypted "critical" packets for insertion into the VOD video server 22. The same or similar algorithms and techniques for performing this manipulation for selective encryption processing as described in the above-referenced patent applications can be adapted to VOD applications for off-line work.

The VOD server 22 may also be modified to allow introduction of streams having multiple service elements (primary video, primary audio, shadow video, shadow audio) uniquely associated with a Passage™ transport. The present video servers generally only allow one each, primary video and audio, respectively. The quartet of data representing Passage™ processed A/V content should preferably be managed as a indivisible set on the VOD video server 22.

Some additional bandwidth efficiencies may be obtained if, at the edge resources, shadow packets are removed from the composite streams in sessions serving legacy clients. Similarly, in certain embodiments, the edge resources, if selective encryption aware, could reinsert the shadow packets embedded in the stored stream in place of the legacy encrypted packets on the original program PID. These improvements would result in no carriage overhead for support of multiple conditional access systems on a single transport.

Hybrid Composite Storage Pre-Encryption

Figure 4:
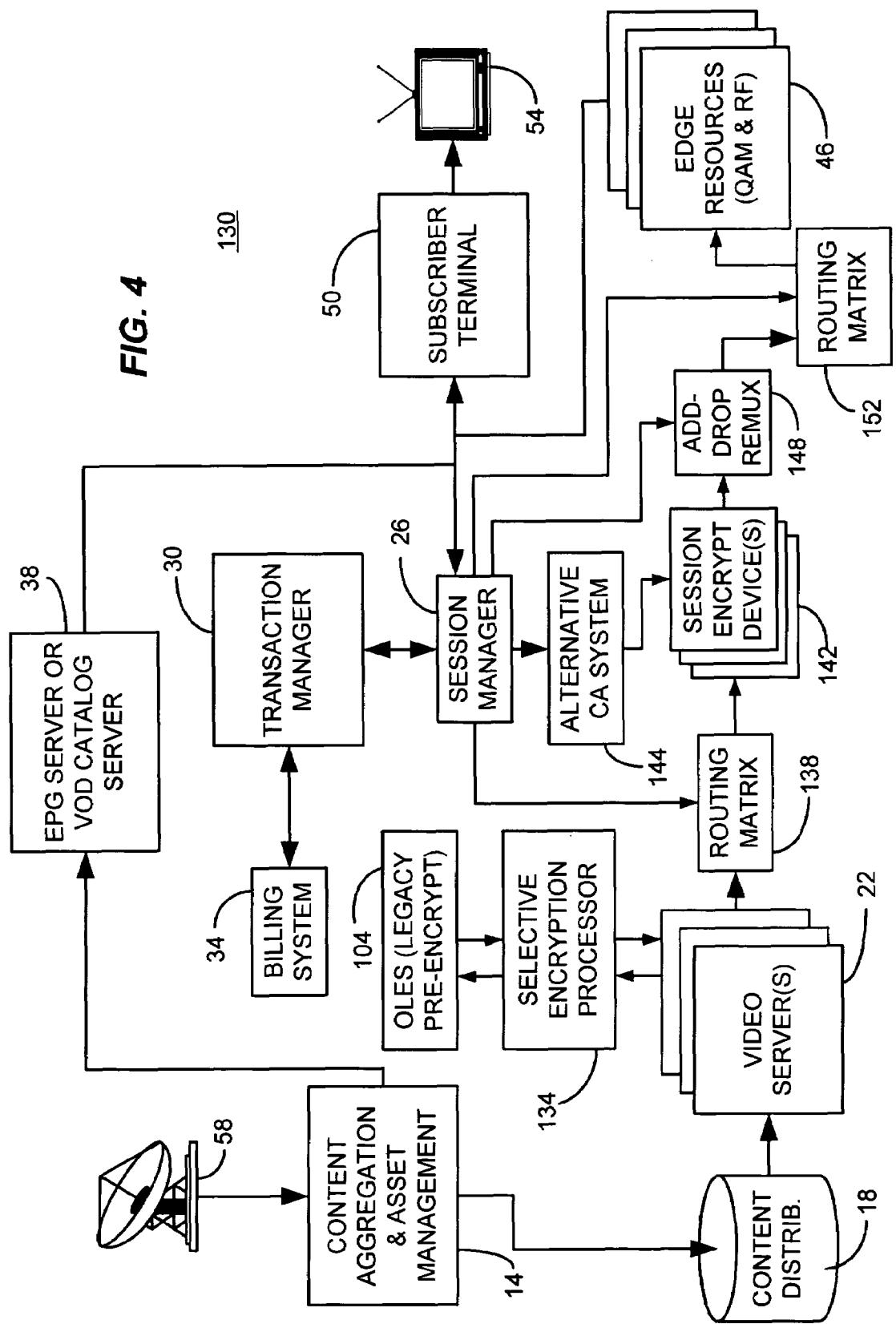
FIG. 4 is a block diagram depicting a hybrid composite VOD system architecture consistent with certain embodiments of the present invention.

Hybrid composite storage is a variant of the composite storage concept, but incorporates elements of session-based encryption for implementing the alternative conditional access encryption. In this scenario, depicted as system 130 of FIG. 4, the legacy "critical" packets, comprising approximately 2-10% of the total content, are pre-encrypted by the legacy conditional access system 104 using selective encryption technology for managing the process. The selective encryption is managed in selective encryption processor 134. The duplicate copy of "critical" packets, which are located on previously unused PIDs, is left unencrypted. This latter aspect is the departure from the composite storage scenario described above. The composite stream of unencrypted non-critical packets, legacy encrypted "critical" packets on the original service PIDs and an unencrypted, duplicate copy of the "critical" packets on alternate service PIDs is stored on the video server 22 as a single stream.

Upon playback to a subscriber session, if the session is destined for a legacy STB (represented by subscriber terminal 50), the existing paradigm for pre-encrypted content is followed and no special action is taken. The stream is routed at routing matrix 138 operating under control of session manager 26, through a session encryption device 142 capable of performing encryption using the alternative conditional access system 144, but the session manager 26 does not provision the device to perform encryption on elements of the stream and it is sent directly to the requesting subscriber without further modification. To maintain security of the outgoing stream and to reduce the bandwidth of the session for legacy sessions, the stream is processed through an add-drop remultiplexer 148 and the clear "critical" content on alternate service PIDs are removed from the outgoing transport. The output stream is then routed at routing matrix 152 to appropriate edge resources 46 for delivery to the subscriber terminal 50. In one embodiment, the session encryption device 142 that performs encryption using the alternative conditional access system also contains the add-drop multiplexer capability. Other variations will also occur to those skilled in the art upon consideration of the present teaching.

If, on the other hand, the session is destined for a non-legacy STB (also as represented in this illustration by subscriber terminal 50, the stream is routed through session encryption device 142 capable of performing encryption using the alternative conditional access system and only the "critical" packets on alternate service PIDs (previously in the clear) are encrypted using the alternative conditional access system 144, as provisioned by the session manager.

Some additional bandwidth efficiencies may be obtained for these non-legacy sessions, if the edge device is selective encryption aware, by reinserting the shadow packets embedded in the stored stream, now encrypted, in place of the legacy encrypted packets on the original program PID. This improvement would result in no carriage overhead for support of multiple conditional access systems on a single transport.

A preprocessor can be used to perform selective encryption of content to be loaded onto the video server. A modified file protocol can be used to allow the video server to import and associate these files. Either the preprocessor or the video server can be designed to perform the indexing. An alternate instantiation could be use to perform all selective encryption pre-processing (e.g., PID mapping and packet duplication) within the VOD video server 22 itself. This could be accomplished by modifying the VOD video server 22 application to add a pre-processor task as a separate executable, called by the VOD video server 22 during the process to prepare content for pre-encryption.

Changes can be implemented to the method employed by the VOD system for creating dynamic PSI data to implement this architecture. The VOD system session manager 26 is made aware of which conditional access method is appropriate for a session requested by a specific subscriber. This information can in turn be transferred to the VOD video server 22 that has been selected as the source for the session so that the appropriate PSI can be created for the session, including conditional access specific data. The VOD video server 22 is cognizant of the conditional access resources (ECMs) for each program stored on the server and these can be dynamically allocated on unique PIDs along with PIDs for the corresponding audio and video data. The PSI generated for each specific session, in addition to indicating the assigned PIDs for A/V, can indicate the appropriate CASID, which is unique to each conditional access system provider and the PID assigned for the ECMs associated with the session.

Likewise, the VOD video server 22 dynamically allocates PIDs for the shadow packets associated with the respective audio and video component streams for each session. This information is included in the PSI sent in sessions requested by non-legacy clients. Just like in the more general composite storage architecture discussed in the previous section, the video server manages multiple resources and PIDs. The hybrid topology reduces the unique entities by one from eight to seven: there is no need for alternative ECM PID or data resource in the stored composite stream. This information will be added later in a downstream device providing the alternative conditional access encryption for those sessions destined for decoding upon a non-legacy client.

Re-Encrypted Distribution

Figure 5:
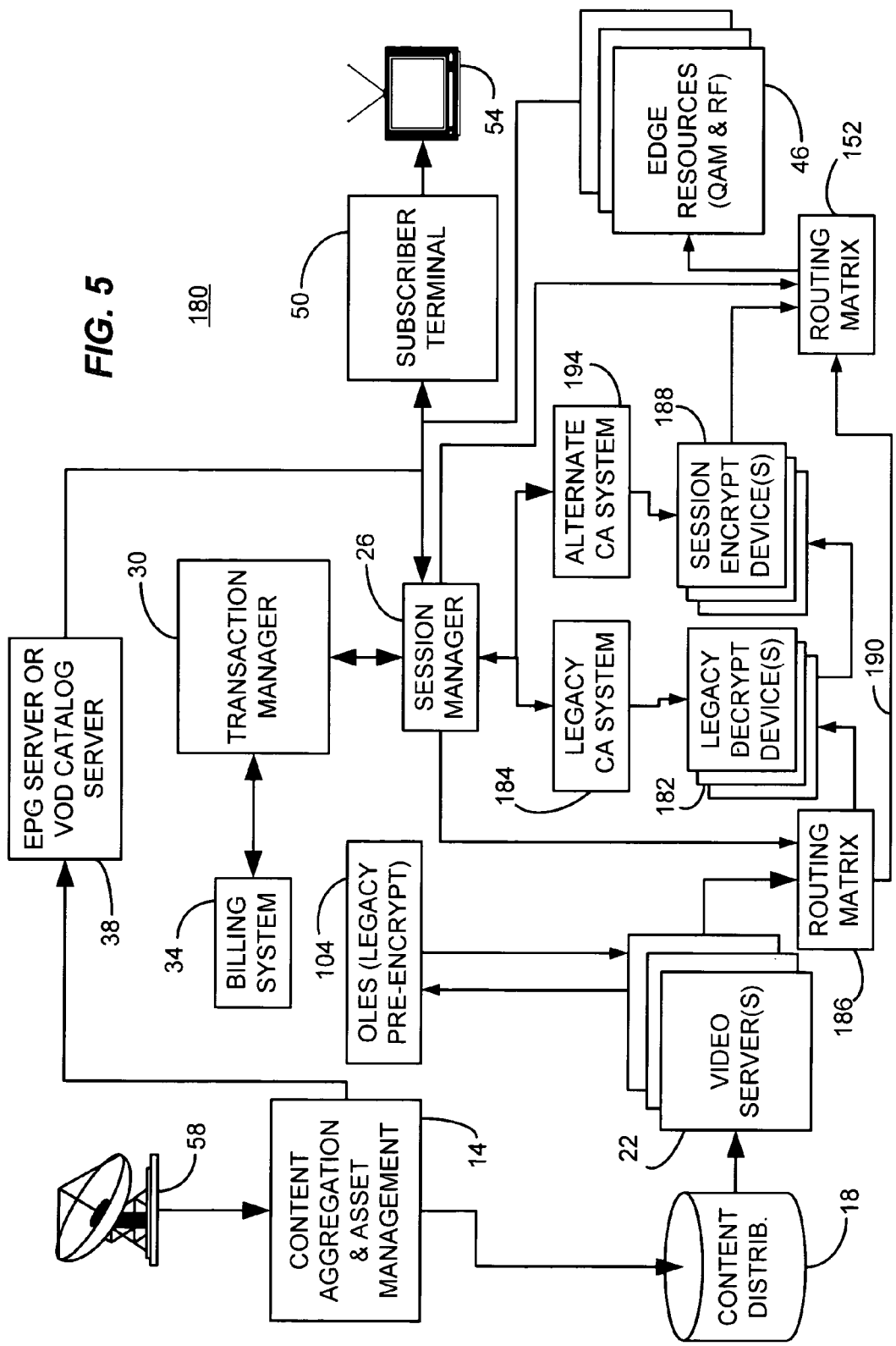
FIG. 5 is a block diagram of a re-encrypted VOD architecture consistent with certain embodiments of the present invention.

A hybrid approach is provided in a re-encrypted distribution architecture. This approach is described in U.S. Patent Application Ser. No. 10/764,202, filed Jan. 23, 2004 to Pedlow Jr. et al., entitled "Re-Encrypted Delivery of Video On Demand Content", which is hereby incorporated by reference. This topology leverages the paradigms established for pre-encrypted content preparation, storage, management, etc. but adds support for session based encryption for the alternative conditional access systems added to an existing incumbent system. Referring to the exemplary embodiment of FIG. 5, a legacy decryption device 182, operating to decrypt using the legacy CA system 184, is added to the transport stream path exiting the VOD video server 22 (via routing matrix 186). After the decryption device 182, the transport stream passes through a contemporary session based encryption device 188. The VOD session manager 26, on a session-by-session basis, determines which sessions will pass through the decryption device 182 intact and be modulated and transmitted to the subscriber unaltered. A path 190 between the routing matrices preserves the pre-encrypted content and delivers it to subscribers having legacy equipment. In either case, the output stream passes through routing matrix 152 to the appropriate edge resources for delivery to the subscriber terminal 50.

Alternatively, the VOD system session manager 26, through interaction with both legacy CA system 184 and alternate CA system 194, can both actuate the decryption device 182 and activate session based encryption device 188 for a particular session, thereby supporting subscribers with non-legacy equipment at their premises. Thus, this system 180 can support either legacy or non-legacy (alternate CA) encryption.

Certain embodiments of this architecture support pre-encryption on legacy systems not presently supporting session-based encryption, while providing the ability to deliver session based encryption for the alternative CA system 194 integrated into the existing legacy network. Certain embodiments of this architecture may face the same issues as mentioned previously and common to other pre-encryption topologies. In addition, it experiences the additional cost burden of a legacy decryption element and the challenges of dynamically configuring and operating such a device. There may be additional costs faced in a specific deployment for switching and routing equipment that may be necessary to move transport streams "around" the legacy decryption device.

Changes can be made to the method employed by the VOD system for creating dynamic PSI data to implement this architecture. The VOD system session manager 26 can be made aware of which conditional access method is appropriate for a session requested by a specific subscriber. This information is in turn transferred to the video server that has been selected as the source for the session so that the appropriate PSI can be created for the session, including conditional access specific data. The video server can be made to be cognizant of the conditional access resources (ECMs) for each program stored on the server and these can be dynamically allocated on unique PIDs along with PIDs for the corresponding audio and video data. The PSI generated for each specific session, in addition to indicating the assigned PIDs for A/V, indicate the appropriate CASID, which is unique to each conditional access system provider and the PID assigned for the ECMs associated with the session.

In this example, the same movie using 3.618 GB of storage in the clear VOD state would require 3.618 GBytes to store using re-encryption supporting two different CA systems.

Dynamic Composition Pre-Encryption

Figure 6:
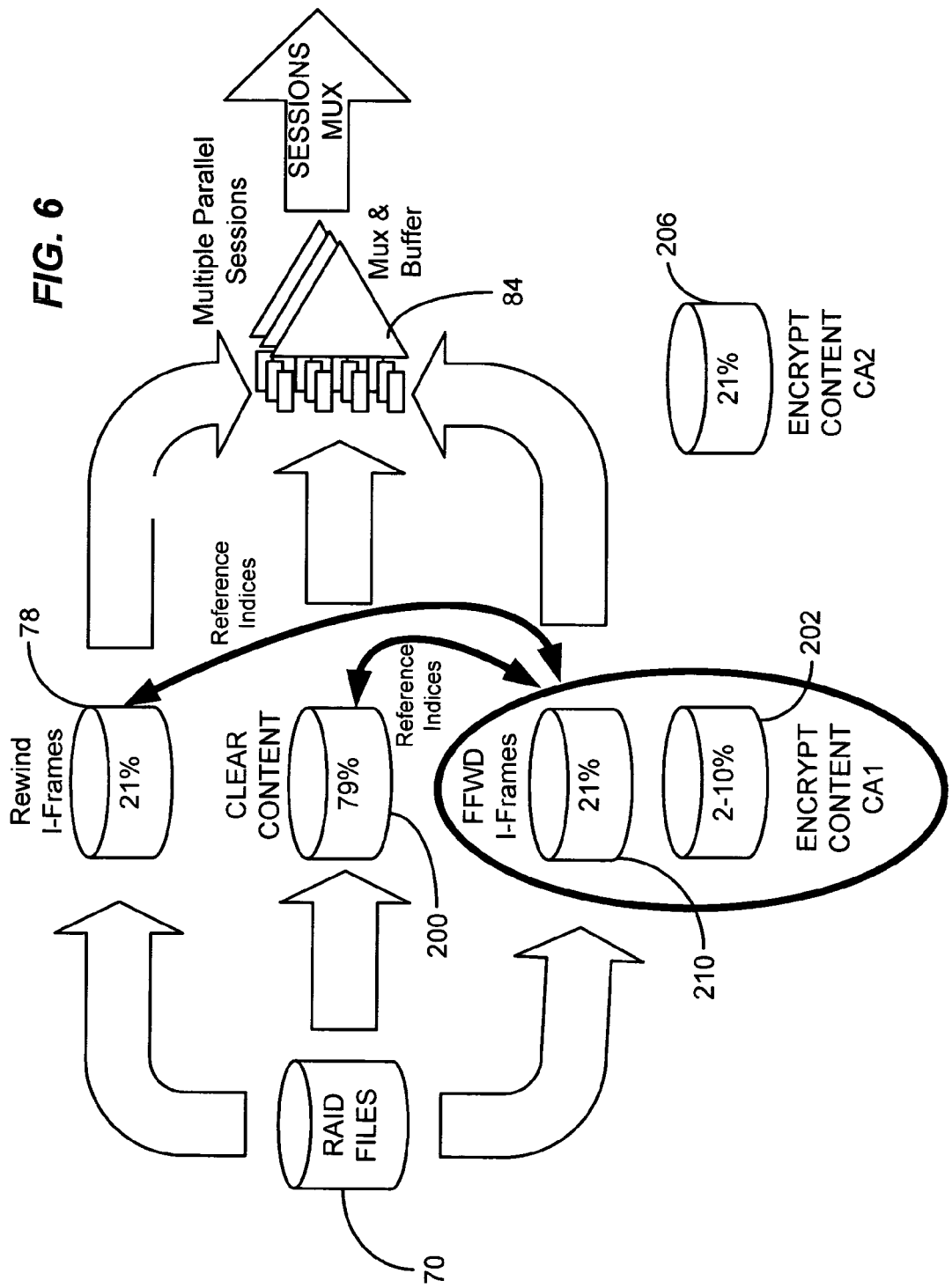
FIG. 6 illustrates a dynamic composition pre-encrypted VOD architecture consistent with certain embodiments of the present invention.

Another pre-encrypted VOD architecture is dynamic composition pre-encryption. In this scheme, each program or movie is stored in three or more elements on the VOD video server 22. Referring to FIG. 6, clear content is stored at 200. Critical packets are selected according to a suitable selection criterion associated with the selective encryption process. Thus, the content that is stored has either "critical" packets or non-critical packets. The "critical" packets generally constitute approximately 2% to 10% of the program (depending upon program content and the selection criteria used to select packets for encryption) and are encrypted. A separate copy of the critical content is maintained for each conditional access system supported by the MSO. In this illustration, for example, the critical packets associated with a first CA system (CA1) is stored at 202 while encrypted content associated with CA 2 is stored at 206. By using a selection criterion that involves selection of certain I-frames, the fast forward I-Frames can be made to incorporate the encrypted content and stored together as encrypted I-frames 210 (and 206). The packets in both the "critical" packet fast forward file 210 as well as the clear (unencrypted), non-critical packet file 200 are indexed to maintain temporal correlation between the two files. These indices either may be monotonic packet counts from start of stream or calculated packet offsets from the last PCR.

When a subscriber session is initiated, the main file 200 containing the clear content, less "critical" and fast forward packets, is queued in the video server for playout. In addition, the file containing the "critical" and fast forward packets 210, pre-encrypted in the CA format appropriate for the CPE of the subscriber requesting the session, is also queued for playout. When the program playback is started, the video server reconstructs a single program multiplex in its stream buffer feeding the outgoing transport the correct sequence of packets based upon the indices in the two component files. Although, in general, only about 2-10% of the packets are encrypted in a selective encryption system according to the above pending patent applications, even further security is provided by encryption of all of the I frames in the present embodiment. Rewind I-frames can be stored either as encrypted or unencrypted packets.

Figure 7:
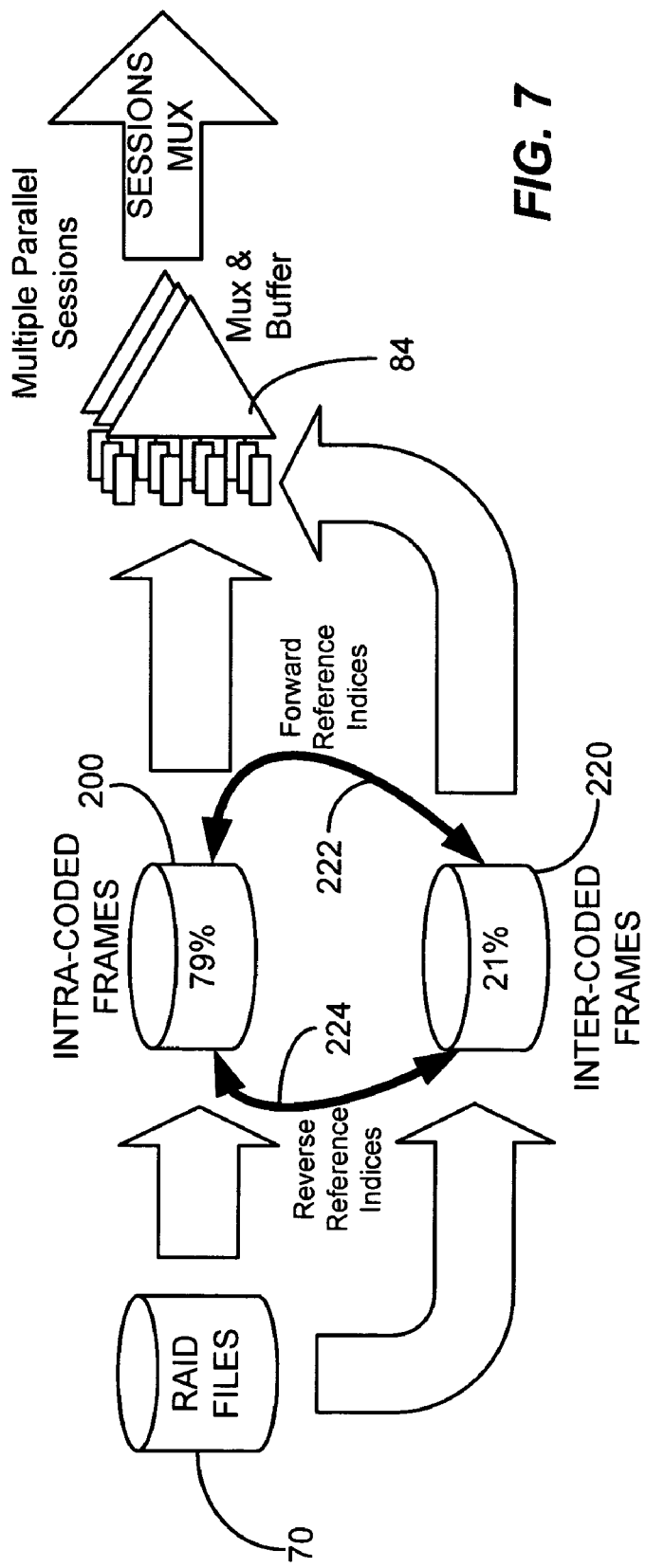
FIG. 7 illustrates a dynamic composition pre-encrypted VOD architecture using dual trick play indices consistent with certain embodiments of the present invention.

While the external composition and data flow appears similar to the clear VOD system depicted in FIG. 1, the internal architecture of the video server changes significantly, as shown in the exemplary storage architecture of FIGS. 6-7.

Certain embodiments of this method offer several distinct advantages that may not be readily apparent. The stream files containing "critical" packets may be the same one as the extracted subfile containing all I-frames for "trick" modes, as was described previously in the general discussion of VOD system architecture. If this opportunity is taken, then a storage economy can be realized over all pre-encrypted schemes including traditional (unencrypted) VOD, as deployed today. The traditional VOD video server has three files for each feature or movie: two containing just I-frames (one in reverse order) and one containing the complete original copy. Research on encoded streams conducted by Sony has shown that the I-frames typically represent between 12%-21% of the total content, typically around 17%. With the dynamic composition method, if the "critical" packet files are chosen to contain complete I-frames, a separate file of critical data used solely for encryption purposes is no longer necessary, saving 2% to 10% storage for this method. In addition, since this method removes the redundant I-frames from the clear stream file, an additional (nominal) 17% storage savings is also realized. This indicates a potential 27% nominal (31% maximum) video server disk storage savings for a single CA system model over the composite storage model VOD system described above.

When compared to the segregated storage model described above, one entire duplicate copy of a program can be eliminated and the addition of one additional CA format adds no storage or bandwidth overhead when compared to a traditional clear VOD server implementation. The reason for the "free" second CA format is that the 17% nominal storage saving realized by using the same I-frame file for both fast forward "trick" modes and "critical" content used for selective encryption is consumed by replicating just the I-frame file and encrypting it with the alternative CA format.

Dynamic Composition Pre-Encryption with Forward and Reverse Indexing

This concept is explained in greater detail in U.S. patent application Ser. No. 10/764,011, filed Jan. 23, 2004 to Pedlow et al. entitled "Bi-Directional Indices for Trick Mode Video On Demand", which is hereby incorporated by reference.

If one takes the concept of dynamic composition pre-encryption described above one step further, the current convention in VOD systems to store the same I-frames of a movie in forward and reversed sequence to allow fast forward and rewind "trick" modes can be eliminated. An illustration of this concept is shown in the example of FIG. 7. These dual files for forward and reverse are replaced by a single file 220 of I-frames in normal forward sequence with two sets of indices, one set 222 for playing the I-frame file in forward order and one set 224 for playing the I-frame file in reverse order. The appropriate sets of indices are chosen depending on whether forward or reverse high-speed motion is desired. The forward indices are also used to reconstruct the normal speed stream when matching the I-frame file to the non-critical content file to reconstruct the entire stream. On a clear or re-encrypted VOD system, this will allow up to about 21% storage savings. On a composite pre-encrypted storage system, up to about 42% storage savings may be realized If the "trick" mode subfile and the "critical" data encrypted content file can be the same, the content is selectively encrypted at approximately a nominal 17% level, much higher than the commonly proposed Passage™ encryption level of approximately 2%, but carrying no inherent storage or system capacity costs, as do other schemes. For this system to work, some changes to the video server software design might be necessary, but these changes would be modifications to the existing processes and would not require substantial new development on the part of the server vendor.

A preprocessor can be used to perform selective encryption of content to be loaded onto the VOD video server 22. A modified file protocol can be used to allow the VOD video server 22 to import and associate these files. Either the preprocessor or the VOD video server 22 can be used to perform the indexing. An alternate instantiation can be used to perform all selective encryption pre-processing within the video server itself. This can be accomplished by modifying the video server application to add a pre-processor task as a separate executable, called by the server during the process to prepare content for pre-encryption.

Additionally, in certain embodiments, this method overcomes the classic pre-encryption issue of supporting trick modes, but retains the other common problems of encryption "shelf life" and the additional handling required to prepare the stream for use on the VOD system.

Changes to the method employed by the VOD system for creating dynamic PSI data can be used to implement this architecture. The VOD system session manager 26 is made to be aware of which conditional access method is appropriate for a session requested by a specific subscriber in order to select the appropriate "critical" data file for the session. This information is in turn transferred to the VOD video server 22 that has been selected as the source for the session so that the appropriate PSI can be created for the session, including conditional access specific data. The VOD video server 22 is cognizant of the conditional access resources (ECMs) for each program stored on the server and these must be dynamically allocated on unique PIDs along with PIDs for the corresponding audio and video data. The PSI generated for each specific session, in addition to indicating the assigned PIDs for A/V, indicates the appropriate CASID, which is unique to each conditional access system provider and the PID assigned for the ECMs associated with the session.

If one refers to the example movie scenario described above, the same movie using 3.618 GB of storage in the clear VOD state would require 3.159 GBytes to store using dynamic composition pre-encryption supporting two different CA systems—a savings of almost 0.5 GB.

Session-Based Encryption VOD Distribution

In session based encryption, a basic premise is that a classic (clear) VOD server 22 such as shown in FIG. 1, is modified to add an encryption device in series with the transport stream between the video server 22 and the QAM modulator of 46. In certain embodiments, the encryption device may be integrated with the QAM modulator 46 and/or other components. The commercially available Scientific-Atlanta MQAM and Harmonic NSG products are commercial examples of such devices.

The outgoing transport stream, containing multiple, independent VOD sessions and serving multiple subscribers, is encrypted at the point of distribution to the plant and in turn to the subscribers. The control of the encryption and entitlements is based upon interaction between the session manager 26, which controls the session, video server 22 and the conditional access system through defined interfaces. Many session based VOD architectures share the following common drawbacks:

- Coordination and/or distribution of entitlements and synchronization between session manager, conditional access system and stream encryption device.
- Security of the clear content from theft or piracy before loading on the video server and while stored in the system.
- Additional costs for adding both legacy and alternate stream encryption devices.
- Availability of legacy stream encryption devices with reasonable densities (session capacity).
- According to MSOs familiar with the subject, session based VOD streams are unsupported by certain existing conditional access technologies.
- With session-based encryption (compared to the pre-encryption scheme) additional security is afforded by the application of unique encryption keys used for every session of the same program.

In most cases, the video server does not need to generate special PSI that is aware of the conditional access method used for a specific session. The encryption device(s) downstream of the video server will append CA information specific to each session processed at the time/point of encryption. The VOD session manager 26 manages which streams are processed by which CA method and in some cases, manages dynamically routing the streams to/through the encryption devices appropriate for a particular session.

As with other architectures, there are variations on the basic architecture of the session-based system and some of those variations are described below.

Segregated Session Based Encryption

Figure 8:
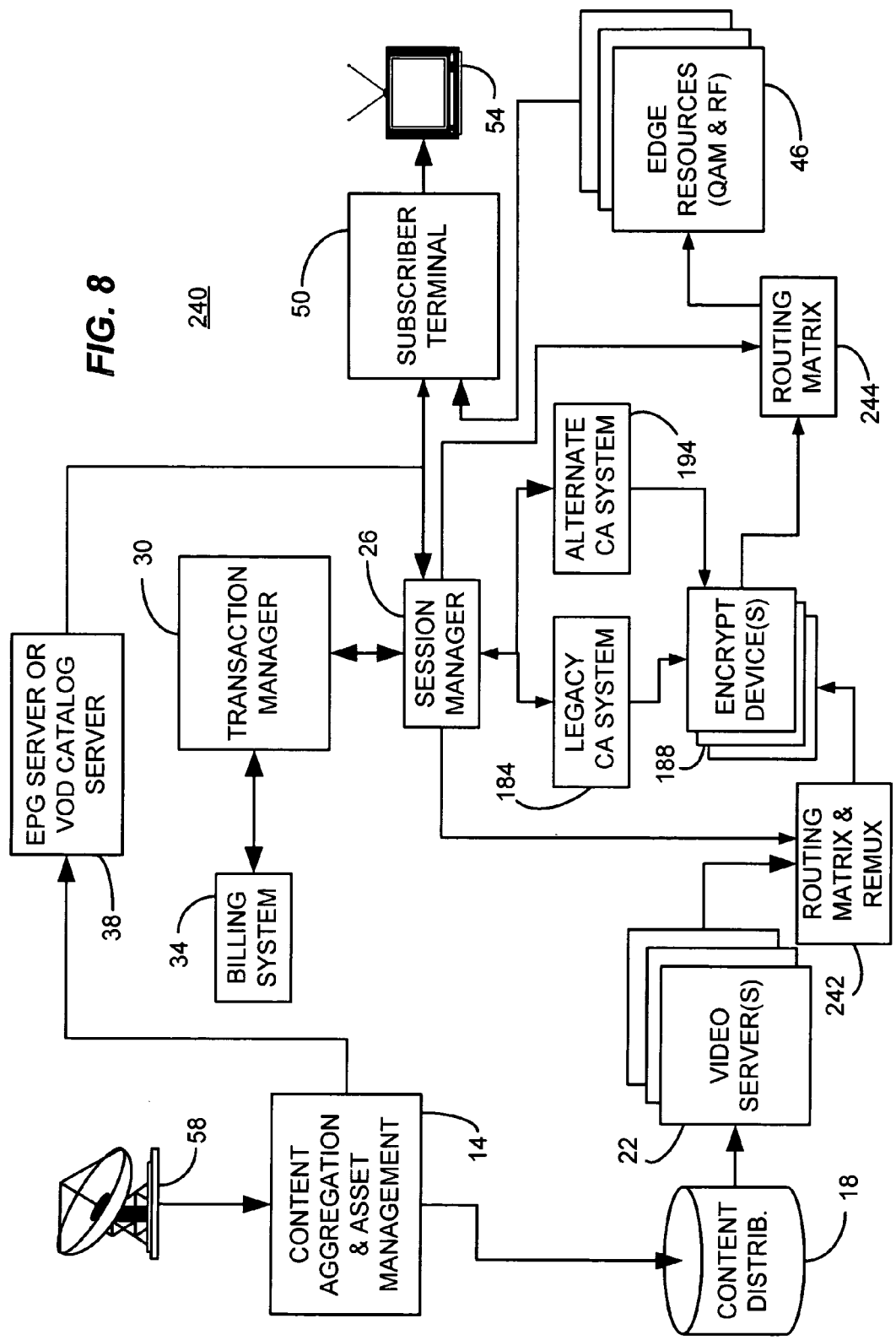
FIG. 8 is a block diagram of a segregated session based encrypted VOD architecture consistent with certain embodiments of the present invention.

Segregated session encryption is the extension of session-based encryption to multiple conditional access systems operating in conjunction with a single VOD system. An exemplary architecture of a segregated session based encryption system 240 is depicted in FIG. 8. System 240 includes provisions for providing the appropriately encrypted stream for a specific subscriber session by routing the outgoing stream from the VOD video server 22 to the subscriber terminal 50 on a transport stream and resultant RF carrier, carrying only a single common conditional access format. Sessions using other conditional access formats are similarly constrained (segregated) to other homogeneously encrypted transports/carriers. There is no sharing of resources between the CA systems and they operate independently.

During initiation of a new session, the VOD session manager 26 determines which conditional access format is used by the requesting subscriber terminal 50 based upon information received either directly from the subscriber terminal 50 or from another source, such as the billing system or other database. The VOD session manager 26 then determines the path to the appropriate encryption resource(s) 184, 188 and 194 having access to an RF node serving the subscriber's service area. This is done in a similar manner to the method used in large centralized clear VOD systems to find the appropriate video server(s) that can deliver a stream to the requesting subscriber. Once an appropriate route is determined, routing matrix and re-multiplexer 242 and routing matrix 244 respectively provide the appropriate routing.

Once a solution to the routing matrix is determined, the session manager 26 coordinates the configuration of the routing elements and directs the CA system to apply encryption to the session through references to the assigned transport resources (PIDs).

This system presents a complex, real-time management requirement for determining usable resources available to apply to a new session and available spectrum transport slots. It uses equipment to perform stream routing (switch fabric) between the VOD video server(s) 22 and the encryption devices 188, though these capabilities might be available integrated into other elements of the system. Additional spectrum is used to maintain segregation of the sessions on homogeneously encrypted transport streams and carriers.

A segregated session based encryption scheme such as 240 uses, to some varying degree, duplication of encryption resources such as encryption devices 188, since support of simultaneous sessions in differing conditional access formats is required. Careful traffic modeling can optimize the tradeoff between system capacity/resource availability and capital expenditure.

If one again refers to the example movie scenario described above, the same movie using 3.618 GB of storage in the clear VOD state would require 3.618 GBytes to store using segregated session based encryption supporting two different CA systems. The system can be optimized in a manner similar to that described in the section describing dynamic composition based pre-encryption. One I-frame file can be removed for rewind and a dual set of indices created for the remaining I-frame file to support both forward and reversed video sequences. In doing so, the total storage required for the example movie could be reduced to 3.159 GBytes.

Composite Session Based Encryption

Figure 9:
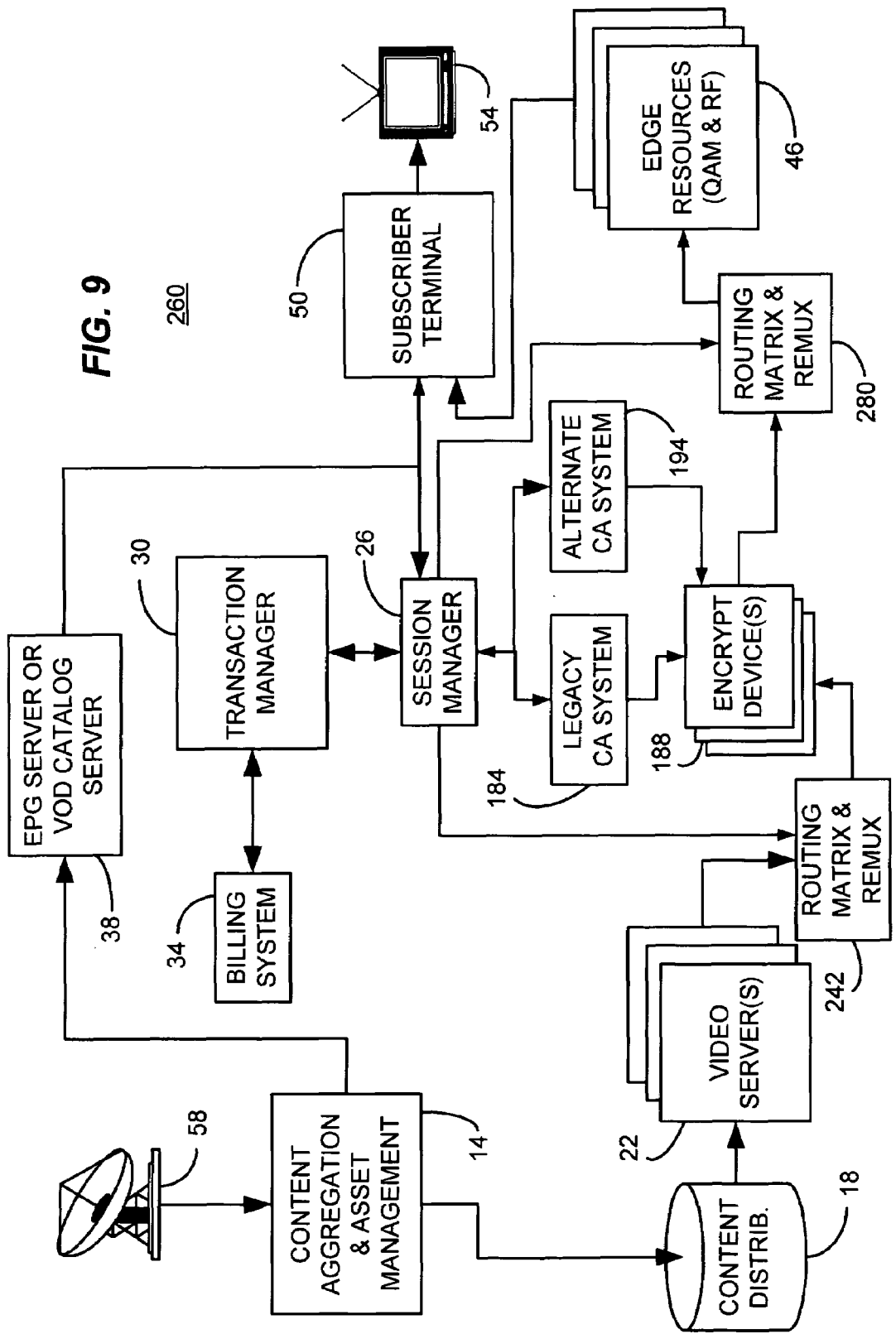
FIG. 9 is a block diagram of a composite session based encrypted VOD architecture consistent with certain embodiments of the present invention.

The composite session based encryption approach (another session based approach) is similar to the segregated approach except that the transport streams/carriers provided to subscribers are heterogeneously encrypted and is depicted embodied in system 260 of FIG. 9. A single transport may contain any combination of two or more conditional access formats operating independently on an MPEG program basis, representing individual subscriber sessions.

This scheme eliminates some of the complex real-time resource management processes used to determine available encryption resources, but instead trades it for the requirement that encryption resources appear in matched sets.

The VOD session manager 26 determines which CA format is appropriate for a given subscriber session and determines a VOD server 22 that has access to the node representing the subscriber's service area. It then activates the appropriate CA resource in the encryption "set" attached to the node. It is noted that a process such as the Passage™ process of selective encryption is not employed, since there is never an opportunity to share any common content between subscriber sessions in a VOD paradigm. A technical consideration that should be considered is the configuration of systems with specific combinations of legacy encryption and/or remultiplexing equipment. This is especially true if the alternative encryption is embodied within the device performing the remultiplexing. The Harmonic NSG is a commercial product that can be used for this purpose. If the legacy system transmits data on unannounced PIDs or has critical latency concerns, this may be problematic if the device performing re-multiplexing is not aware of these requirements.

Figure 10:
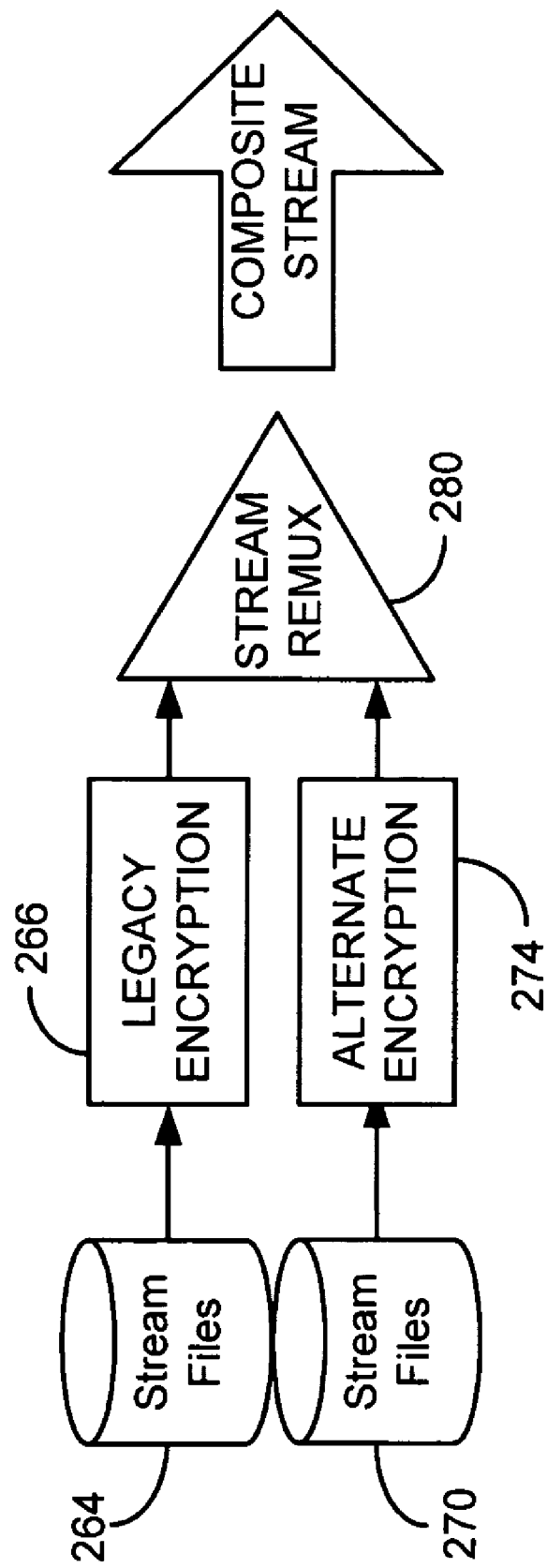
FIG. 10 illustrates composite session based encryption content flow consistent with certain embodiments of the present invention.

FIG. 10 depicts the encrypted content flow from stream files to composite stream in a composite session based encryption system. Stream files 264 are processed by legacy encryption device 266, while stream files 270 are processed by the alternate CA encryption device 274. The output streams from encryption devices 266 and 274 are multiplexed at stream re-multiplexer 280 to produce the composite stream as an output to the subscribers.

If one again refers to the example movie scenario described above, the same movie using 3.618 GB of storage in the clear VOD state would require 3.618 GBytes to store using composite session based encryption supporting two different CA systems. The system could be optimized in a manner similar to that described in the section describing dynamic composition based pre-encryption. One I-frame file would be removed for rewind and a dual set of indices created for the remaining I-frame file to support both forward and reversed video sequences. In doing so, the total storage required for the example movie could be reduced to 3.159 GBytes.

Batch-Based Encryption VOD Distribution

Figure 11:
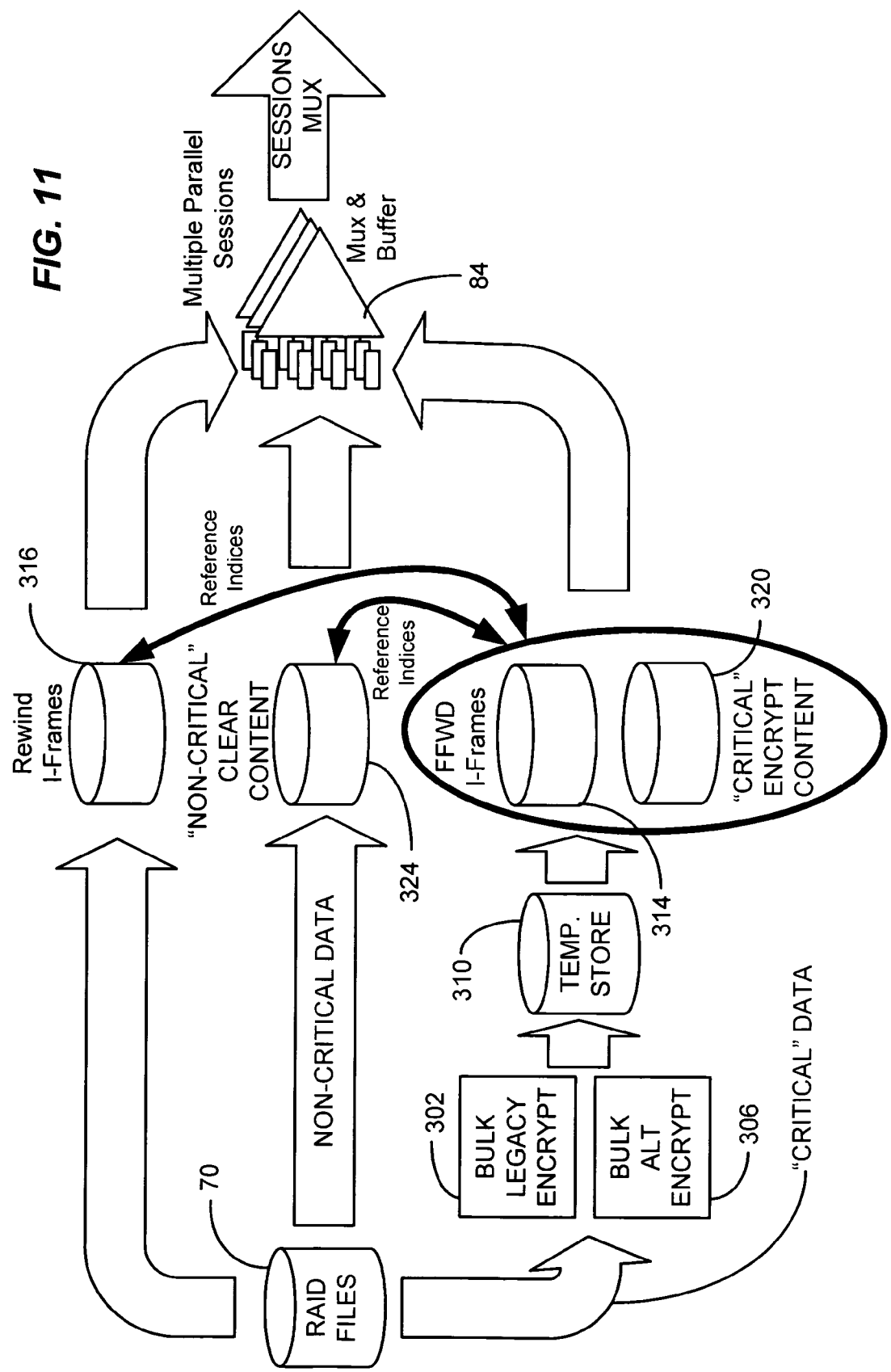
FIG. 11 illustrates batch based encrypted VOD server content flow consistent with certain embodiments of the present invention.

The concept of batch-based encryption for VOD distribution, another session based mechanism, as depicted in FIG. 11 represents many of the best aspects of both session and pre-encrypted architectures. As can be seen in FIG. 11, the batch based VOD system has a topology different from the other systems presented in this document.

The content can be stored entirely in the clear on the VOD video server 22, similar to the session-based system, but is contained in two files, representing "critical" packets and non-critical packets, just as in the case of the dynamic composition architecture. Likewise, the same opportunities for storage efficiency are available if the "critical" packet files are also used as the "trick" mode I-frame files 314 and 316 as shown. However, unlike the dynamic composition architecture, the "critical" packets are stored in RAID files 70 unencrypted. Additionally, this scheme departs from the dynamic composition architecture because there is no requirement to maintain an independent copy of the "critical" packet file for each conditional access system supported, providing further, substantial storage savings over the other architectures, typically on the order of approximately 12% to 21% per conditional access system supported if the critical packets are the same as the I Frames. Otherwise, the critical content may be approximately 2-10 percent.

The Fast Forward I frames are generally not encrypted. So, critical content is identified and stored in a separate file. Once the encryption format is determined, data are burst in at a maximum rate through the appropriate encryption device and stored in temporary storage 310. Regular non-critical content is sent to 324. From there on, critical and non-critical content is spooled and multiplexed in by the Multiplexer and Buffer 84 for sending to the STB at the regular transport rate.

Thus, in this example, a Video On Demand (VOD) method consistent with certain embodiments involves processing content to be delivered in a VOD method by selecting first portions of the content for encryption under a selective encryption system and selecting second portions of the content to remain unencrypted. The first and second portions are stored until receiving a request for delivery of the content, the request being from a terminal having decryption capabilities associated with a first decryption method. The first portions are then bulk encrypted in bulk legacy encrypter 302 to produce encrypted first portions stored at 320. The encrypted first portions are stored in a temporary store 310. The second portions are queued to temporary storage at 324 for delivery to the terminal. A stream of selectively encrypted content is assembled from the encrypted first portions and the second portions.

Figure 12:
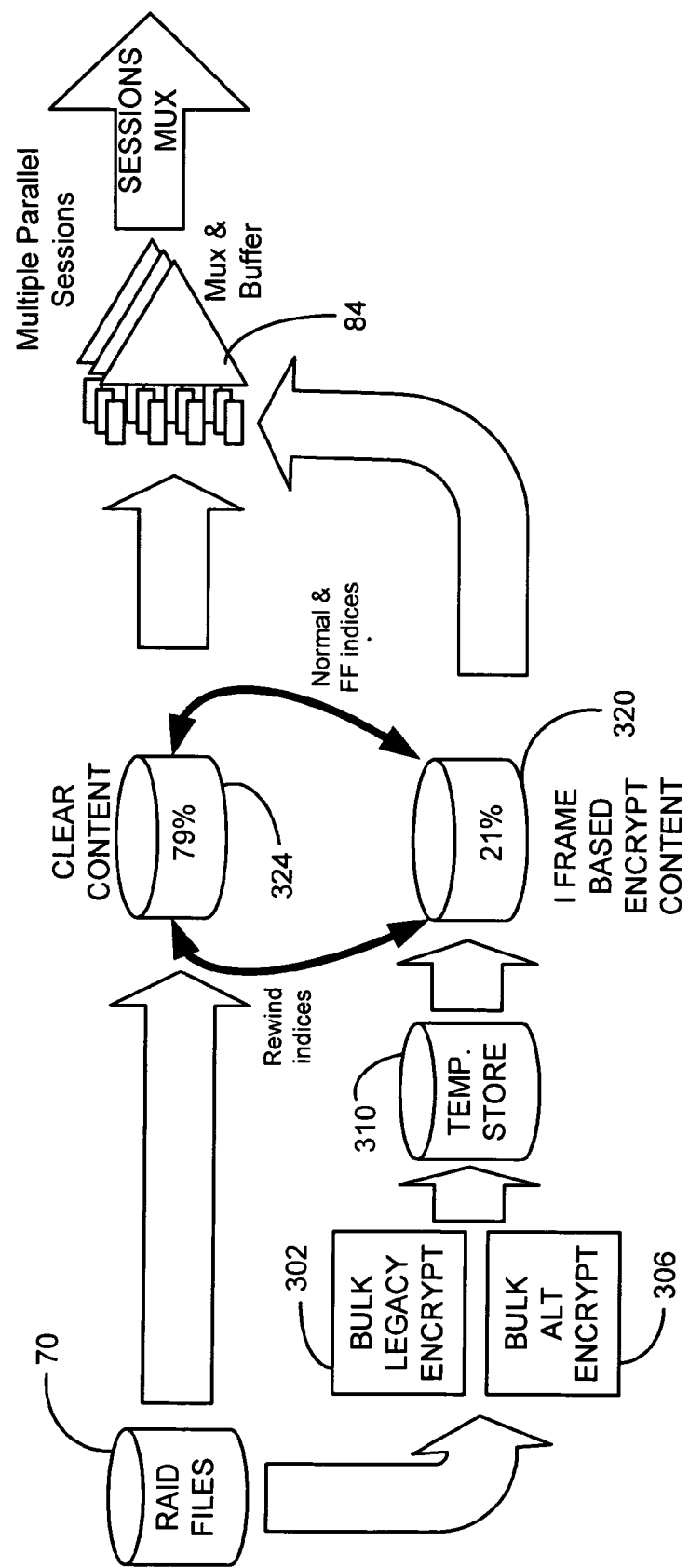
FIG. 12 illustrates an optimized batch based encrypted VOD server content flow consistent with certain embodiments of the present invention.

FIG. 12 shows a system similar to that of FIG. 11 except that this system utilizes the dual indexing to provide trick play as described in conjunction with FIG. 7.

When the session manager 26 initiates a new session at the request of a subscriber terminal 50, the encryption technology appropriate for the subscriber's equipment is determined. The file for the selected feature containing the clear, non-critical content is queued in the VOD video server 22 for playout. In addition, a second file, containing the clear stream of "critical" packets is accessed; its contents are immediately streamed through a dedicated port on the VOD video server 22 at the maximum sustainable transport medium data rate (1 Gbit/S for Gig-E, 200+Mbit/S for ASI, 38.8 Mbit/S for DHEI) directly to the encryption resource identified by the session manager, i.e., either legacy encryption device 302 or alternate CA encryption device 306. This burst transferred file of I-frames, constituting only about 12% to 21% of the video frames (assuming the critical content equates to the I Frames) in the program is bulk encrypted at the highest rate that the encryption device 302 or 306 and transport media can sustain. The encrypted I-frame content that emerges from the encryption device is captured to either a RAM or disk buffer 310 resources within the VOD video server 22. For a 2-hour movie, with a nominal 17% (approximately) I-frame content, this would require 450 Mbytes of temporary storage per session.

When the program playback is started, a multiplexer reconstructs in the stream buffer feeding the outgoing transport the correct sequence of packets based upon the indices in the clear, non-critical content component file and the smaller, batch-encrypted content that was captured back to the VOD video server, as described above.

This architecture, in addition to the storage efficiencies described both under the dynamic composition architecture description as well as in the previous paragraph, offers additional, significant advantages in certain embodiments. The batch encryption of "critical" packet files can allow for a significant reduction in the number of encryption devices required to provide encrypted delivery of VOD content. If one assumes support of two independent conditional access systems using this architecture, the I-frame and critical data residing in the same file and using a typical I-frame overhead (~17%), then a single pair of encryption devices (incumbent & alternative) can support the same number of sessions as 60 pairs of encryption devices in a session based architecture (60:1). Another advantage over the pre-encryption scheme, shared with session-based encryption, is the additional security afforded by the application of unique encryption keys used for every session of the same program.

An alternate embodiment pre-encrypts sessions of I-frames and stores them in the buffer for later consumption. In this manner, there would be no latency to delivering a new session due to the time overhead required to batch encrypt the file. The buffer of pre-encrypted I-frames could be replenished in the background to maintain a constant "inventory" of available sessions for delivery.

The method employed by the VOD system for creating dynamic PSI data can be modified to implement this architecture. The VOD system session manager 26 can be made aware of which conditional access method is appropriate for a session requested by a specific subscriber. This information is in turn transferred to the VOD video server 22 that has been selected as the source for the session so that the appropriate PSI can be created for the session, including conditional access specific data. The VOD video server 22 can be cognizant of the conditional access resources (ECMs) for each program stored on the server and these are dynamically allocated on unique PIDs along with PIDs for the corresponding audio and video data. The PSI generated for each specific session, in addition to indicating the assigned PIDs for ANV, must indicate the appropriate CASID, which is unique to each conditional access system provider and the PID assigned for the ECMs associated with the session.

If one again refers to the example movie scenario described above, the same movie using 3.618 GB of storage in the clear VOD state would require 2.700 GBytes to store using batch-based encryption supporting two different CA systems.

Thus, a Video On Demand server arrangement, consistent with certain embodiments, receives content from a selective encryption processor that processes content to be delivered in a VOD method by selecting first portions of the content for encryption under a selective encryption system and selecting second portions of the content to remain unencrypted. At least one computer readable storage device is provided. The processor stores the first and second portions in the at least one computer readable storage device. When the processor receives a request for delivery of the content, the request being from a terminal having decryption capabilities associated with a first decryption method, it is programmed to send the first portions to an encrypter that encrypts the first portions using a bulk encryption process to produce encrypted first portions. The processor then stores the encrypted first portions in a buffer and queues the second portions for delivery to the terminal. The processor is programmed to then assemble a stream of selectively encrypted content from the encrypted first portions and the second portions.

Figure 13:
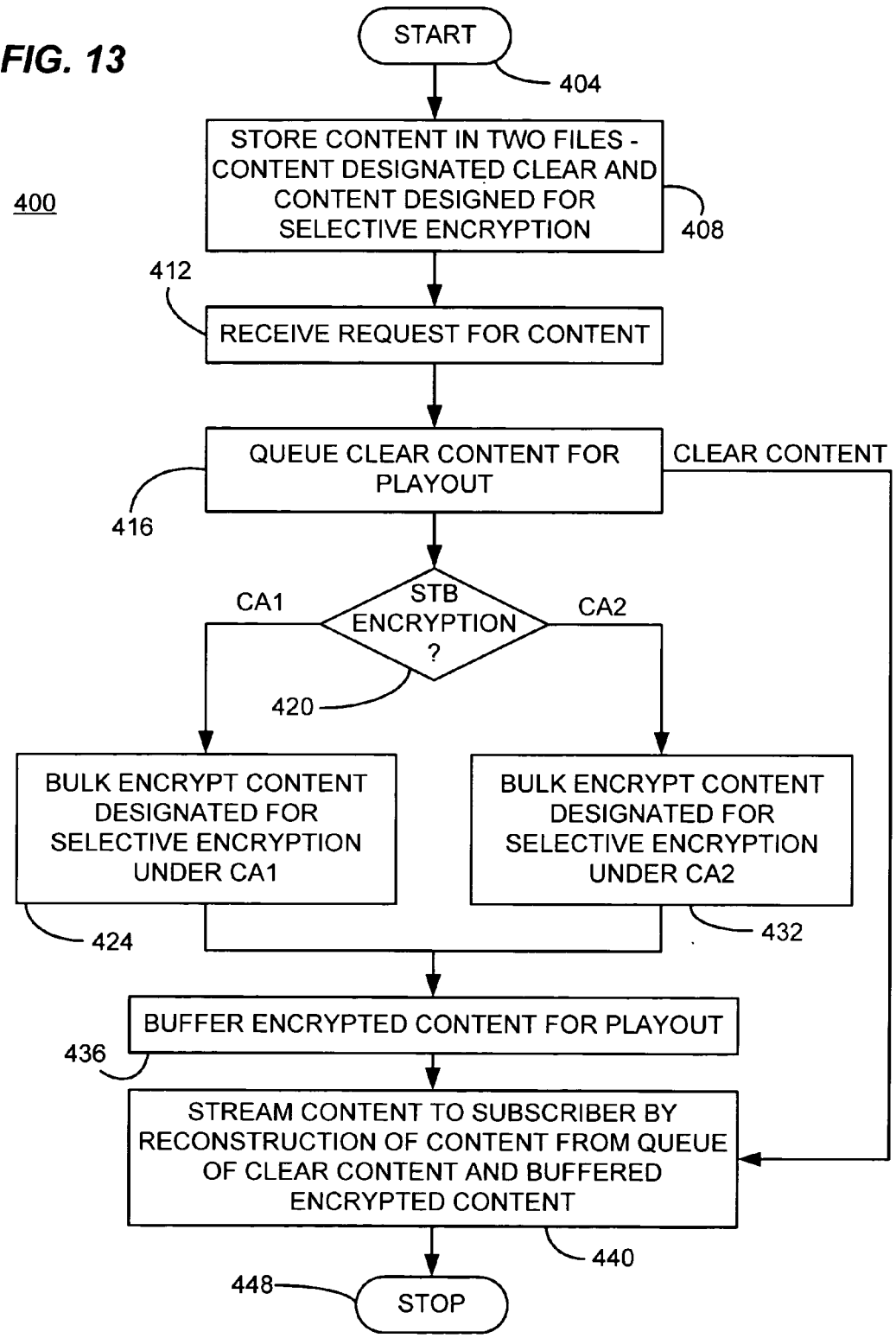
FIG. 13 is a flow chart depicting batch based encrypted VOD.

Referring now to FIG. 13, a flow chart depicts a process 400 for batch based encryption of VOD content consistent with certain embodiments starting at 404. In this embodiment, the content (movie, etc.) is stored in the VOD server 22 on two separate files at 408- one for content designated as clear, and one designated for encryption. In a selective encryption process, certain selected portion of the content is encrypted while the remaining content remains unencrypted. The first file contains all content that is designated in a selective encryption selection process to remain unencrypted. The second file contains all content that is designated in the selective encryption selection process to be encrypted. At 412, when a request for the content is retrieved, the content designated to remain clear is spooled up from the first file to a queue at 416 for delivery to the subscriber.

In the present example, two possibilities for encryption are available, namely CA1 and CA2 (which, for example, can represent legacy encryption and an alternative encryption process). The subscriber's STB is likely only capable of decryption under CA1 or CA2, so a determination is made at 420 as to which conditional access system is associated with the STB making the request for content. This can be accomplished in any number of ways, including providing that information at the time of a request for content or looking up that information in a database (e.g., a database stored at the billing system 34 or elsewhere). If the request comes from a STB that is enabled for decryption of CA1 encrypted content, the second file containing the content designated by the selective encryption algorithm for encryption is bulk encrypted at 424 using the CA1 encryption system. If, on the other hand, the request comes from a STB that is enabled for decryption of CA2 encrypted content, the second file containing the content designated by the selective encryption algorithm for encryption is bulk encrypted at 432 using the CA2 encryption system.

In either case, the encrypted content from 424 or 432 is passed to 436 where the encrypted content is buffered up for playout to the requesting STB at 436. At 440, the content is played out by streaming the content to the requesting STB. This is accomplished by reconstructing a complete content stream from the clear content queued up from the first file and the encrypted content from the second file. The content can then be streamed to the recipient STB at 440 and the process ends at 448.

Thus, a Video On Demand (VOD) method consistent with certain embodiments involves processing content to be delivered in a VOD method by selecting first portions of the content for encryption under a selective encryption system and selecting second portions of the content to remain unencrypted; storing the first portions; storing second portions file; receiving a request for delivery of the content, the request being from a terminal having decryption capabilities associated with a first decryption method; encrypting the first portions using a bulk encryption process to produce encrypted first portions; storing the encrypted first portions in a buffer; queuing the second portions for delivery to the terminal; and assembling a stream of selectively encrypted content from the encrypted first portions and the second portions.

A Video On Demand (VOD) method, consistent with certain embodiments involves processing content to be delivered in a VOD method by selecting first portions of the content for encryption under a selective encryption system and selecting second portions of the content to remain unencrypted; receiving a request for delivery of the content, the request being from a terminal having decryption capabilities associated with a specified decryption method; encrypting the first portions under a specified encryption method using a bulk encryption process to produce encrypted first portions, the specified encryption method being selected from one of a plurality of encryption methods; storing the encrypted first portions in a first file; storing second portions in a second file; storing the encrypted first portions in a buffer; queuing the second portions for delivery to the terminal; and assembling a stream of selectively encrypted content from the encrypted first portions and the second portions. The first and second portions may be stored in a VOD server in first and second files in accordance with certain embodiments.

Those skilled in the art will recognize, upon consideration of the above teachings, that certain of the above exemplary embodiments are based upon use of a programmed processor serving, for example, as video server or servers 22 or session manager 26. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain embodiments herein were described in conjunction with specific circuitry that carries out the functions described, other embodiments are contemplated in which the circuit functions are carried out using equivalent software or firmware embodiments executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A Video On Demand (VOD) method, comprising:
processing content to be delivered in a VOD method by selecting first portions of the content for encryption under a selective encryption system and selecting second portions of the content to remain unencrypted;
storing the first portions;
storing second portions;
receiving a request for delivery of the content, and determining that the request is from a terminal having decryption capabilities associated with a first decryption method;
after receiving the request for delivery of the content and determining that the request is from a terminal having decryption capabilities associated with the first decryption method, encrypting the first portions using a bulk encryption process compatible with the first decryption method to produce encrypted first portions;
storing the encrypted first portions in a buffer;
queuing the second portions for delivery to the terminal; and
assembling a stream of selectively encrypted content from the encrypted first portions and the second portions.

2. The VOD method according to claim 1, wherein the first portions are stored in a first file and the second portions are stored in a second file.

3. The VOD method according to claim 2, wherein the first and second files are stored in a VOD server.

4. The VOD method according to claim 1, further comprising streaming the selectively encrypted content to the terminal.

5. The VOD method according to claim 1, wherein the decryption method comprises a legacy encryption method.

6. The VOD method according to claim 1, wherein the decryption method comprises a non-legacy encryption method.

7. The VOD method according to claim 1, wherein the first and second portions are stored in a VOD server.

8. The VOD method according to claim 1, carried out under control of a programmed processor.

9. A Video On Demand (VOD) method, comprising:
processing content to be delivered in a VOD method by selecting first portions of the content for encryption under a selective encryption system and selecting second portions of the content to remain unencrypted;
storing the first portions in a first file;
storing second portions in a second file;
receiving a request for delivery of the content, and determining that the request is from a terminal having decryption capabilities associated with a first decryption method;
after receiving the request for delivery of the content and determining that the request is from a terminal having decryption capabilities associated with the first decryption method, encrypting the first portions using a bulk encryption process compatible with the first decryption method to produce encrypted first portions;
storing the encrypted first portions in a buffer;
queuing the second portions for delivery to the terminal; and
assembling a stream of selectively encrypted content from the encrypted first portions and the second portions.

10. The VOD method according to claim 9, wherein the first and second files are stored in a VOD server.

11. The VOD method according to claim 9, further comprising streaming the selectively encrypted content to the terminal.

12. The VOD method according to claim 9, wherein the decryption method comprises a legacy encryption method.

13. The VOD method according to claim 9, wherein the decryption method comprises a non-legacy encryption method.

14. The VOD method according to claim 9, carried out under control of a programmed processor.

15. A computer readable storage medium storing instructions which, when executed on a programmed processor, carry out a process of:
processing content to be delivered in a VOD method by selecting first portions of the content for encryption under a selective encryption system and selecting second portions of the content to remain unencrypted;
storing the first portions in a first file;
storing second portions in a second file;
receiving a request for delivery of the content, and determining that the request is from a terminal having decryption capabilities associated with a first decryption method;
after receiving the request for delivery of the content and determining that the request is from a terminal having decryption capabilities associated with the first decryption method, delivering the first portions to an encrypter compatible with the first decryption method for encryption using a bulk encryption process to produce encrypted first portions;
receiving and storing the encrypted first portions in a buffer;
queuing the second portions for delivery to the terminal; and
assembling a stream of selectively encrypted content from the encrypted first portions and the second portions.

16. The storage medium according to claim 15, further comprising streaming the selectively encrypted content to the terminal.

17. The storage medium according to claim 15, wherein the decryption method comprises a legacy encryption method.

18. The storage medium according to claim 15, wherein the decryption method comprises a non-legacy encryption method.

19. A Video On Demand server arrangement, comprising:
means for receiving content from a selective encryption processor that processes content to be delivered in a VOD method by selecting first portions of the content for encryption under a selective encryption system and selecting second portions of the content to remain unencrypted;
at least one computer readable storage device;
a processor that:
stores the first and second portions in the at least one computer readable storage device;
receives a request for delivery of the content, and determines that the request is from a terminal having decryption capabilities associated with a first decryption method;
means for sending the first portions to an encrypter that encrypts the first portions using a bulk encryption process compatible with the first decryption method to produce encrypted first portions, after receiving the request for delivery of the content and determining that the request is from a terminal having decryption capabilities compatible with the first decryption process;
and wherein the processor further:
stores the encrypted first portions in a buffer;
queues the second portions for delivery to the terminal; and
assembles a stream of selectively encrypted content from the encrypted first portions and the second portions.

20. The VOD server according to claim 19, wherein the first portions are stored in a first file and the second portions are stored in a second file.

21. The VOD server according to claim 19, further comprising means for streaming the selectively encrypted content to the terminal.

22. The VOD server according to claim 19, wherein the encrypter encrypts using a legacy encryption method.

23. The VOD server according to claim 19, wherein the encrypter encrypts using a non-legacy encryption method.

24. A Video On Demand (VOD) method, comprising:
processing content to be delivered in a VOD method by selecting first portions of the content for encryption under a selective encryption system and selecting second portions of the content to remain unencrypted;
storing the first portions;
storing second portions;
receiving a request for delivery of the content, and determining that the request is from a terminal having decryption capabilities associated with a specified decryption method;

after receiving the request for delivery of content and determining that the request is from a terminal having decryption capabilities associated with the specified decryption method, encrypting the first portions under the specified encryption method using a bulk encryption process to produce encrypted first portions, the specified encryption method being one of a plurality of possible encryption methods;
storing the encrypted first portions in a buffer;
queuing the second portions for delivery to the terminal; and
assembling a stream of selectively encrypted content from the encrypted first portions and the second portions.

25. The VOD method according to claim 24, wherein the first portions are stored in a first file and the second portions are stored in a second file.

26. The VOD method according to claim 25, wherein the first and second files are stored in a VOD server.

27. The VOD method according to claim 24, further comprising streaming the selectively encrypted content to the terminal.

28. The VOD method according to claim 24, wherein the specified decryption method comprises a legacy decryption method.

29. The VOD method according to claim 24, wherein the second decryption method comprises a non-legacy decryption method.

30. The VOD method according to claim 24, wherein the first and second portions are stored in a VOD server.

31. The VOD method according to claim 24, carried out under control of a programmed processor.

32. A Video On Demand (VOD) method, comprising:
processing content to be delivered in a VOD method by selecting first portions of the content for encryption under a selective encryption system and selecting second portions of the content to remain unencrypted;
storing the first portions in a first file;
storing second portions in a second file;
receiving a request for delivery of the content, and determining that the request is the from a terminal having decryption capabilities associated with a specified decryption method;
after receiving the request for delivery of the content and determining that the request is from a terminal having decryption capabilities associated with the specified encryption method, encrypting the first portions under the specified encryption method using a bulk encryption process to produce encrypted first portions, the specified encryption method being one of a plurality of possible encryption methods;
storing the encrypted first portions in a buffer;
queuing the second portions for delivery to the terminal; and
assembling a stream of selectively encrypted content from the encrypted first portions and the second portions.

33. The VOD method according to claim 32, wherein the first and second files are stored in a VOD server.

34. The VOD method according to claim 32, further comprising streaming the selectively encrypted content to the terminal.

35. The VOD method according to claim 32, wherein the encryption method comprises a legacy encryption method.

36. The VOD method according to claim 32, wherein the encryption method comprises a non-legacy encryption method.

37. The VOD method according to claim 32, carried out under control of a programmed processor.

38. A computer readable storage medium storing instructions which, when executed on a programmed processor, carry out a process of:
processing content to be delivered in a VOD method by selecting first portions of the content for encryption under a selective encryption system and selecting second portions of the content to remain unencrypted;
storing the first portions;
storing second portions;
receiving a request for delivery of the content, and determining that the request is from a terminal having decryption capabilities associated with a specified decryption method;
after receiving a request for delivery of the content, and determining that the request is from a terminal having decryption capabilities associated with a specified decryption method, encrypting the first portions under the specified encryption method using a bulk encryption process to produce encrypted first portions, the specified encryption method being one of a plurality of possible encryption methods;
storing the encrypted first portions in a buffer;
queuing the second portions for delivery to the terminal; and
assembling a stream of selectively encrypted content from the encrypted first portions and the second portions.

39. The storage medium according to claim 38, further comprising streaming the selectively encrypted content to the terminal.

40. The storage medium according to claim 38, wherein the decryption method comprises a legacy decryption method.

41. The storage medium according to claim 38, wherein the decryption method comprises a non-legacy decryption method.

42. A Video On Demand server arrangement, comprising:
means for receiving content from a selective encryption processor that processes content to be delivered in a VOD method by selecting first portions of the content for encryption under a selective encryption system and selecting second portions of the content to remain unencrypted;
at least one computer readable storage device;
a processor that:
stores the first and second portions in the at least one computer readable storage device;
receives a request for delivery of the content, and determining that the request is from a terminal having decryption capabilities associated with a second decryption method;
means for sending the first portions to an encrypter that encrypts the first portions under one of a plurality of encryption methods using a bulk encryption process to produce encrypted first portions after receiving the request for delivery of the content and determining that the request is from a terminal having decryption capabilities associated with the second decryption method;
means for storing the encrypted first portions in a buffer;
a memory queue that queues the second portions for delivery to the terminal; and
means for assembling a stream of selectively encrypted content from the encrypted first portions and the second portions.

43. The VOD server according to claim 42, wherein the first portions are stored in a first file and the second portions are stored in a second file.

44. The VOD server according to claim 42, further comprising means for streaming the selectively encrypted content to the terminal.

45. The VOD server according to claim 42, wherein the second encrypter encrypts using a legacy encryption method.

46. The VOD server according to claim 42, wherein the second encrypter encrypts using a non-legacy encryption method.

* * * * *

UNITED STATES PATENT AND TRADEMARK OFFICE
CERTIFICATE OF CORRECTION

| | | |
|---|---|---|
| PATENT NO. | : 7,263,187 B2 | Page 1 of 1 |
| APPLICATION NO. | : 10/828737 | |
| DATED | : August 28, 2007 | |
| INVENTOR(S) | : Pedlow, Jr. et al. | |

It is certified that error appears in the above-identified patent and that said Letters Patent is hereby corrected as shown below:

In col. 9, line 36, delete "ANV", and insert -- A/V-- therefor.

In col. 19, line 47, delete "ANV", and insert -- A/V-- therefor.

Signed and Sealed this

Eleventh Day of December, 2007

JON W. DUDAS
*Director of the United States Patent and Trademark Office*